(12) United States Patent
Jenkins et al.

(10) Patent No.: US 12,177,555 B2
(45) Date of Patent: Dec. 24, 2024

(54) INFORMATION CAPTURE SYSTEM AND PROCESSING

(71) Applicant: IOTTA LLC, Cedar Hill, TX (US)

(72) Inventors: L. William Matthew Jenkins, Cedar Hill, TX (US); Joseph Mark Jenkins, Cedar Hill, TX (US)

(73) Assignee: IOTTA, LLC, Cedar Hill, TX (US)

( * ) Notice: Subject to any disclaimer, the term of this patent is extended or adjusted under 35 U.S.C. 154(b) by 55 days.

(21) Appl. No.: 18/061,268

(22) Filed: Dec. 2, 2022

(65) Prior Publication Data
US 2023/0114454 A1    Apr. 13, 2023

Related U.S. Application Data

(63) Continuation-in-part of application No. PCT/US2021/035369, filed on Jun. 2, 2021.

(60) Provisional application No. 63/395,140, filed on Aug. 4, 2022, provisional application No. 63/285,434, filed on Dec. 2, 2021, provisional application No. 63/033,394, filed on Jun. 2, 2020.

(51) Int. Cl.
*H04N 23/611* (2023.01)
*H04N 23/65* (2023.01)
*H04N 23/80* (2023.01)

(52) U.S. Cl.
CPC ........... *H04N 23/611* (2023.01); *H04N 23/65* (2023.01); *H04N 23/80* (2023.01)

(58) Field of Classification Search
CPC ....... H04N 23/611; H04N 23/65; H04N 23/80
See application file for complete search history.

(56) References Cited

U.S. PATENT DOCUMENTS

| | | | |
|---|---|---|---|
| 5,537,181 A | * | 7/1996 | Owashi ................. G03B 13/02 396/296 |
| 6,513,015 B2 | | 1/2003 | Ogasawara |
| 6,584,375 B2 | | 6/2003 | Bancroft |
| 7,742,952 B2 | | 6/2010 | Bonner |
| 7,987,111 B1 | | 7/2011 | Sharma |

(Continued)

FOREIGN PATENT DOCUMENTS

| AU | 2011343977 A1 | 7/2013 |
|---|---|---|
| WO | 2011014881 A1 | 2/2011 |

(Continued)

OTHER PUBLICATIONS

Partial International Search Report dated Aug. 11, 2021, PCT/US2021/035369 filed on Jun. 2, 2021.

(Continued)

*Primary Examiner* — Hung H Lam
(74) *Attorney, Agent, or Firm* — Andrew M. Metrailer; Conley Rose, P.C.

(57) ABSTRACT

In an embodiment, a device comprises a solar panel configured to harvest power from energy emitted as light by an indoor light source, a camera, and a processor coupled to the solar panel and the camera. The processor can be configured to: receive at least some of the power harvested by the solar panel, capture an image via the camera, and transmit the image to a computing device. A battery can be coupled to the solar panel and the processor that can be configured to store at least some of the power harvested by the solar panel and provide at least some of the stored power to the processor.

17 Claims, 8 Drawing Sheets

(56) References Cited

U.S. PATENT DOCUMENTS

| | | |
|---|---|---|
| 8,195,499 B2 | 6/2012 | Angell |
| 8,502,869 B1 | 8/2013 | Fuhr |
| 8,577,136 B1 | 11/2013 | Ascher |
| 9,230,510 B1* | 1/2016 | Sivertsen ................ G09G 5/14 |
| 9,569,692 B2 | 2/2017 | Xie |
| 10,074,098 B2 | 9/2018 | Maity |
| 10,387,896 B1 | 8/2019 | Hershey |
| 10,430,841 B1 | 10/2019 | Shah |
| 10,474,972 B2 | 11/2019 | Iwai |
| 11,151,584 B1* | 10/2021 | Sharma ................ G06V 40/174 |
| 11,599,392 B1* | 3/2023 | Huang ................ G06V 10/17 |
| 2002/0010655 A1 | 1/2002 | Kjallstrom |
| 2003/0055707 A1 | 3/2003 | Busche |
| 2006/0010030 A1 | 1/2006 | Sorensen |
| 2006/0195361 A1 | 8/2006 | Rosenberg |
| 2006/0200378 A1 | 9/2006 | Sorensen |
| 2007/0115363 A1* | 5/2007 | Nakamura ........... H04N 23/634 348/208.14 |
| 2008/0018738 A1 | 1/2008 | Lipton |
| 2008/0049848 A1 | 2/2008 | Turnbull |
| 2008/0215462 A1 | 9/2008 | Sorensen |
| 2008/0294475 A1 | 11/2008 | Zenor |
| 2008/0306804 A1 | 12/2008 | Opdycke |
| 2009/0179753 A1 | 7/2009 | Bonner |
| 2009/0192921 A1 | 7/2009 | Hicks |
| 2009/0240571 A1 | 9/2009 | Bonner |
| 2009/0326807 A1 | 12/2009 | Ramaswamy |
| 2010/0066541 A1 | 3/2010 | Craine |
| 2012/0150586 A1 | 6/2012 | Harper |
| 2013/0096982 A1 | 4/2013 | Miyazaki |
| 2013/0226539 A1 | 8/2013 | Shaw |
| 2014/0225992 A1 | 8/2014 | McDowall |
| 2015/0032511 A1 | 1/2015 | Haddad |
| 2015/0269598 A1* | 9/2015 | Terrazas ................ G06V 20/176 705/7.34 |
| 2015/0294136 A1* | 10/2015 | Musial ................ G06V 40/193 382/118 |
| 2015/0332087 A1* | 11/2015 | Joshi ................ G06F 18/23 382/203 |
| 2015/0381930 A1* | 12/2015 | Quinn ................ H04N 7/147 348/14.14 |
| 2016/0162910 A1 | 6/2016 | Pradhan |
| 2016/0283092 A1* | 9/2016 | Broyde ................ G06Q 50/01 |
| 2019/0148083 A1* | 5/2019 | Lindström ........... H01G 9/2068 438/82 |
| 2020/0074154 A1 | 3/2020 | el Kaliouby |
| 2021/0360201 A1* | 11/2021 | Hu ................ H04N 23/61 |
| 2022/0091666 A1* | 3/2022 | Wu ................ G06F 3/012 |
| 2022/0092138 A1* | 3/2022 | Price ................ G06Q 30/0203 |

FOREIGN PATENT DOCUMENTS

| | | |
|---|---|---|
| WO | 2013043590 A1 | 3/2013 |
| WO | 2015177525 A1 | 11/2015 |
| WO | 2018203512 A1 | 11/2018 |
| WO | 2020076356 A1 | 4/2020 |
| WO | 2021247649 A1 | 12/2021 |

OTHER PUBLICATIONS

International Search Report and Written Opinion dated Oct. 14, 2021, PCT/US2021/035369 filed on Jun. 2, 2021.

International Preliminary Report on Patentability dated Dec. 15, 2022, PCT/US2021/035369 filed on Jun. 2, 2021.

* cited by examiner

INFORMATION CAPTURE SYSTEM AND PROCESSING

CROSS-REFERENCE TO RELATED APPLICATIONS

This application is a continuation-in-part of International Application No. PCT/US2021/035369 filed on Jun. 2, 2021 and entitled "Image Capture System and Processing", which claims the benefit of U.S. Provisional Application No. 63/033,394 filed on Jun. 2, 2020 and entitled, "Image Capture System and Processing," both of which are incorporated herein by reference in their entirety for all purposes.

This application also claims priority to and the benefit of: 1) U.S. Provisional Application No. 63/285,434 filed on Dec. 2, 2021 and entitled, "Image Capture System and Processing," and 2) U.S. Provisional Application No. 63/395,140 filed on Aug. 4, 2022 and entitled, "Information Capture System and Processing,", both of which are incorporated herein by reference in their entirety for all purposes.

BACKGROUND

In various environments it can be beneficial to capture visual data for transmission, analysis, or other use. At least one such environment is a retail environment. A retail environment can pose particular challenges to flexible implementation of visual data capture devices. Such challenges can result from ever-changing product display or other furniture layouts, a single-use or disposable nature of product displays, unavailability of mains power at a desired location, and other various challenges.

SUMMARY

In an embodiment, a device comprises a dye-sensitized solar panel configured to harvest power from energy emitted as light by an indoor light source, a camera, and a processor coupled to the dye-sensitized solar panel and the camera. The processor can be configured to: receive at least some of the power harvested by the dye-sensitized solar panel, capture an image via the camera, and transmit the image to a computing device. A battery can be coupled to the dye-sensitized solar panel and the processor that can be configured to store at least some of the power harvested by the dye-sensitized solar panel and provide at least some of the stored power to the processor.

In an embodiment, a system comprises a computing device, an artificial light source, and an image capture device wirelessly communicatively coupled to the computing device. The image capture device can be configured to: harvest power from light emitted by the artificial light source, capture an image via the camera, and transmit the image to the computing device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
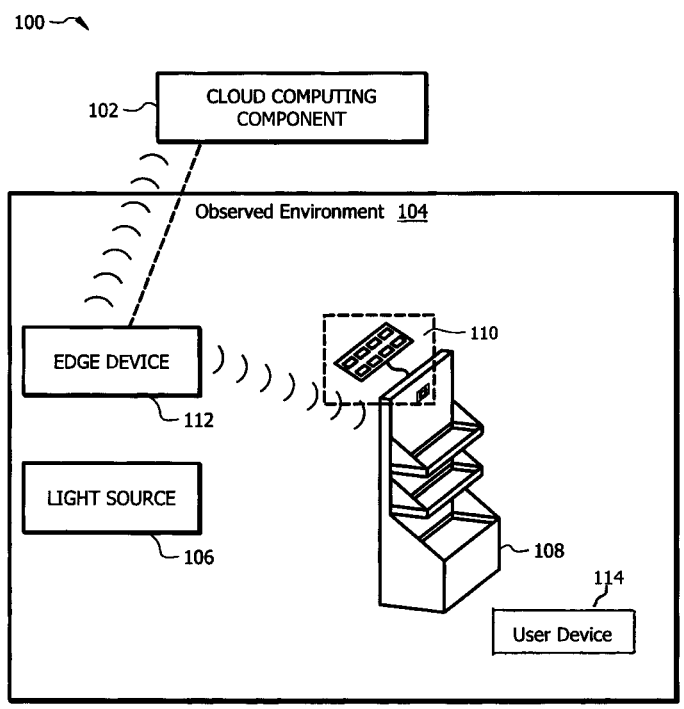
FIG. 1 is a block diagram of an illustrative system in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a retail environment, it can be beneficial to learn consumer trends related to certain products or offerings. These trends can indicate popularity of certain products, a particular demographic, group, or class that shows interest in certain products, etc. For example, certain retail space may be more valuable than other retail space. This certain retail space can be referred to as promotional space and can include areas such as end-cap spaces, eye-level space, freestanding spaces (e.g., isle centers, displays near entry or exit doors, etc.), "out of place" spaces (e.g., candy and popcorn displays located near movies instead of only in a food section), near checkout registers, etc. In some examples, at least some of this promotional space is compensated such that a vendor having products appear in the promotional space pays a retailer for having that vendor's products appear in the promotional space. Furthermore, in some examples, vendors prepare and distribute, or make arrangements with third-parties to prepare and distribute, marketing materials to retailers. These marketing materials can include signage, pop-up or assemblable displays that either appear alongside products or serve as shelving or storage for the products, and other similar marketing materials to bring attention to the vendor's products being offered by the retailer. The payment for the promotional space, and the design, manufacturing, and distribution of the marketing materials may create spending decisions for the vendors.

One way to make or justify these vendor spending decisions is through data indicating an expected return on investment for the vendor spending or effectiveness of product placement in the promotional space or of the marketing materials. That data can include information related to expected sales resulting from the vendor spending or sales that have already occurred from ongoing vendor spending that is under consideration for renewal or expansion. In an example, the data may indicate demographic information about consumers who visit the retailer such as age, gender, race, etc. In another example, the data may indicate trends within the retail environment such as brand recognition, level of consumer engagement with a promotional space or product, a number of consumers passing a particular space per unit of time, a consumer traffic pattern within the retail environment, an amount of time that a given consumer engages with the particular space (e.g., a dwell time), etc. The value of this data, in at least some examples, creates an additional potential revenue stream for retailers. For example, retailers may collect the data and provide the data to vendors at a cost to enable the vendors to have greater insight into where they spend money on promotional spaces or marketing materials. In another example, a first vendor (or group of vendors) may collect the data and provide the data to a second vendor at a cost to enable the vendors to have greater insight into where the second vendor may choose to spend money on promotional spaces or marketing materials. As one exemplary use case, a vendor may be considering spending money on promotional space or marketing materials in a particular retail environment for a product primarily of interest to persons age 18 to 23. If the data obtained from the retailer, or another vendor, indicates that persons age 18 to 23 make up only one percent of the consumers who regularly visit that particular retail environment, the vendor may choose to instead spend money on promotional spaces or marketing materials at another retail environment whose consumer base more closely aligns to the vendor's product. Similar decisions about the value of certain promotional space and/or effectiveness of marketing materials can be made based on criteria set by the vendor.

While collection of the data can be advantageous to the retailer, the collection can also be costly and/or inconvenient. For example, the retailer could employ additional workers to monitor certain promotional spaces or products related to marketing materials and record information regarding consumer demographics and/or engagement either passively through observation or actively through surveying consumers. However, such an approach incurs cost for the additional workers, is limited in scope, and has a potential for creating unfavorable feelings among at least some of the consumers. Another example includes the use of capture devices to monitor the promotional spaces and/or products related to the marketing materials and computing devices to analyze output of the capture devices to derive the data. However, this approach, too, faces potential difficulty. For example, some promotional spaces or marketing materials are located in an indoor area that lacks easy access to mains power. Additionally, at least some promotional space displays or marketing materials are single use in nature and disposable, whereas the capture devices may not be generally considered single use or disposable.

Other options for collecting information can include the use of cameras to collect video images. The use of video cameras can present a number of issues. For example, video cameras are relatively expensive and must be connected to a significant source of power using a wired connection. This type of connection limits the available placement locations while also requiring expertise and an involved installation procedure. Further, the use of video images requires extensive processing power to determine information from the images. For example, even low frame rate video can result in over 2 million frames per day to process, which can require significant communication links and processing power.

To address at least some of the above difficulties in collecting the data, this description includes a capture device, system, and methods that can be single use and used in the absence of mains power. In some contexts, the capture device can be used to capture an image, and may be referred to an image capture device. The capture device, in at least some examples, is referred to as an Internet of Things (IoT) device because the capture device includes wireless communication connectivity. The capture device, in at least some examples, is powered by a battery that is recharged wirelessly. The wireless charging, in at least some examples, is performed via light-sensitive material (such as solar cells or dye-sensitized solar cells) absorbing energy emitted by lights (e.g., either sunlight or an artificial light source such as lightbulbs of any suitable technology) and converting that light into power for recharging the battery and/or powering the capture device.

The capture device, in at least some examples, captures images at predefined intervals and transmits those images for analysis. In other examples, the capture device performs pre-processing on the images prior to transmission for analysis. The transmission is, in some examples, to an edge device. The edge device, in some examples, performs additional processing and/or analysis of the images according to artificial intelligence algorithms. In at least some examples, the edge device further controls the capture device, such as controlling a rate of image capture and transmission or other characteristics related to power management. The edge device transmits the images and/or data derived from the images to a server (e.g., such as in a cloud computing environment) for further analysis and data presentation to a user.

The capture device as described herein can be used to capture a number of images suitable for obtaining the same or similar information as more complex systems. For example, the same or similar demographic information can be obtained from the capture device as described herein by capturing between 1,000-4,000 images per day as can be obtained using video systems, which may nearly three orders of magnitude less than obtained from video images. As an example, capturing one image per minute for an entire day may only result in around 1,440 images. A similar number of images may be captured using a higher capture rate during designated time (e.g., high traffic times), which may allow for similar data as obtained from videos without the need for video cameras, wired power, expensive installations, or time-consuming processing of the video feed.

In various other examples, the capture device described herein can be used to capture other information or data which may be processed by the capture device and/or transmitted by the capture device for other analysis or processing in a manner substantially similar to that described herein with respect to images. In some examples, the other information may include audio, such as audio recordings captured by the capture device. In some examples, the other information includes data obtained from one or more sensors communicatively coupled to the capture device. For example, the data may be obtained from one or more sensors suitable for providing measurements related to weather or other atmospheric conditions (e.g., temperature, dewpoint, humidity, air pressure, etc.). In yet other example, the data may be obtained from one or more sensors that provide environmental data, positional or location data, etc. For example, the capture device may be used to capture environmental information such as temperature, atmospheric pressure, humidity, dewpoint, or the like, and the corresponding sensors can be incorporated into the capture device to obtain the relevant data at specified intervals. As another example, the capture device can detect, or alternatively access information sources that provide the relevant information for the capture device's location, information such as weather patterns, environmental conditions, or proximity to water (e.g., lakes, rivers, oceans, etc.).

In some aspects, the advertisements can be selected to match market availability, market price, or selected for a specific time for a set duration per segmented ad or per capture device 110. Information such as market data, market price, and the like (e.g., information on holidays, sporting events, special event data, and the like) can be used to select an advertisement for presentation. In some aspects, the advertisements can be selected and presented a pre-determined number of times (e.g., a number of views, etc.) and/or for a predetermined time period. In some examples, the other information includes data obtained from a user device, such as data transmitted from the user device to the capture device or data read by the capture device from the user device. The data may be processed by the capture device or by a device that receives the data from the capture device, prior to use. For example, a statistical distribution may be determined of the data over a period of time.

In some aspects, the data from the capture device 110 can be used to provide an environmental advertisement for the store or environment, which may be associated with where the capture device 110 is located. The environmental advertisement can be any suitable form of feedback that can be provided across an environment, including any of those described herein. Suitable environmental advertisements can include audio selections (e.g., songs, audio advertisements, audio playlists, advertisement playlists, etc,), lighting selections, environmental controls (e.g., temperature changes, airflow changes, etc.), or the like. Any of the information provided here by the capture device 110 and/or capture device processing can be used as a basis for selecting the environmental advertisement. Information such as market data, market price, and the like (e.g., information on holidays, sporting events, special event data, and the like) can be used to select an environmental advertisement for presentation. In some examples, the other information includes data obtained from a user device, such as data transmitted from the user device to the capture device or data read by the capture device from the user device. The data may be processed by the capture device or by a device that receives the data from the capture device, prior to use.

As used herein, a user device may be a device of a consumer or other individual who comes within a sensing range of the capture device. The sensing range may be a field of view of the capture device, a distance at which it becomes technologically possible or feasible for the capture device and the user device to communicate, a distance at which the capture device becomes capable of detecting information regarding the consumer or user device, etc. In various examples, the user device is a smart device of the user, such as a smartphone, a tablet, a wearable device, an augmented-reality device, a virtual-reality device, or a combination thereof. For example, the user device may be a smartphone or wearable device, such as glasses, that includes augmented reality functionality.

While this description often refers to the retailer as collecting and providing the data to the vendor, in some examples the vendor collects the data. For example, the vendor, or a third-party engaged by the vendor, may provide the retailer with a display or marketing materials that are at least partially prefabricated and are then assembled on site by the retailer, an agent or representative of the vendor, or a third-party engaged by the vendor. The display or marketing materials include among their components, the capture device and instructions for affixing the capture device to the display or marketing materials and activating the capture device. After activation, the capture device operates in a manner substantially similar to that described above, providing the images and resulting data to the vendor, or to another third party, without collection by the retailer and without necessitating the vendor obtain the data from the retailer.

Additionally, while this description is generally made with reference to a retail environment, the teachings of the description are applicable to other environments. For example, the teachings of the description are applicable to both indoor and outdoor environments, as well as environments other than marketing, including but not limited to security environments. In some examples, the teachings of the description are applicable to any environment in which observations may be made about nearby persons and insights derived from those observations. Such an environment may be an advertising environment in which insights may be derived about persons and advertisements provided based on those insights (in some examples, to at least some of the person on which the insights are based) in a just-in-time manner. In at least some examples, the advertisement may be provided within about 1-100 milliseconds (ms), for example, within about 2 ms, about 5 ms, about 10 ms, about 20 ms, about 50 ms, or about 100 ms, within about 0.1 seconds, within about 0.5 seconds, or within about 1 second of the capture device capturing data at least partially based on which the advertisement is determined, which may take the latencies inherent within the system into account. For example, advertisements may be identified and/or provided to a user device of one of the persons based on the insights within a threshold amount of time of observations of the person being captured and/or the insights determined (e.g., such as a threshold amount of time for qualification as just-in-time delivery of the advertisement according to industry practice, standard, or agreement).

For example, the capture device 110 can be used in other observed environments, which can include retail environments, but can also include settings such as security, social gatherings (e.g., sporting events, malls, parks, etc,.) lawn and garden, other outdoor areas, residential settings, etc. In these settings, the capture device can capture demographic information in addition to other observations such as distance between people (e.g., social distancing monitoring, etc.), thermal images to determine temperatures of people, audio, and the like. The information can be captured and displayed in a dashboard along with the other information described herein.

Referring now to FIG. 1, a block diagram of an illustrative system 100 in accordance with various examples is shown. The system 100 includes both a cloud computing component 102 and an observed environment 104, which in some embodiments can be a retail environment but can also include other environments such as social settings, sporting events, security settings, advertisement settings, etc. In at least some examples, the observed environment 104 is an indoor environment including a light source 106, a display 108, a capture device 110, and an edge device 112. In other examples, the observed environment 104 is an outdoor environment that includes the light source 106, the display 108, the capture device 110, and the edge device 112. The capture device 110 is adapted to interface with the display 108, for example, by being affixed to the display 108 and/or affixed to a position that can view the display or an area around the display 108 (such as view an area in front of the display 108 from a perspective of the display 108). The capture device 110 can be communicatively coupled to the edge device 112, which is communicatively coupled to the cloud computing component 102. In at least some examples, the light source 106 and the edge device 112 can be co-located and/or are, or exist in, the same device.

The cloud computing component 102 is any computing device capable of performing computer processing. In at least one example, the cloud computing component 102 is a processing device, a computer system, a server, a computing resource, a cloud-computing node, or an artificial intelligence computing system capable of processing received data and/or images. The cloud computing component 102 can be centralized (e.g., a single server) or de-centralized (e.g., a plurality of computing nodes). In at least some examples, the cloud computing component 102 is capable of performing processing according to artificial intelligence algorithms, for example, to derive or determine demographic or other information from images, data sets, or other data captured by the capture device 110 and provided, in some form, to the cloud computing component 102.

In some examples, the cloud computing component 102 is capable of identifying an appropriate, applicable, or otherwise suitable advertisement based on the determined information. For example, the cloud computing component 102 may identify an advertisement that is targeted by an advertiser to a demographic represented by one or more persons in view of, or otherwise nearby, the capture device 110 and/or the display 108. The cloud computing component 102 may provide the identified advertisement to the one or more persons. In some examples, the cloud computing component 102 may transmit the advertisement to a user device 114 of the one or more persons through the edge device 112 and/or the capture device 110. In other aspects, the capture device 110 and/or the edge device 112 may transmit the advertisement to the user device 114 via the cloud computing component. Transmission through the cloud computing component 102 may allow for the advertisement to be sent to multiple user devices 114 at or near the same time, as described in more detail herein. In some implementations, transmitting the advertisement may include transmitting the content itself of the advertisement. In other implementations, transmitting the advertisement may include transmitting a token, identifier, or other data element that causes the user device 114 to display the advertisement responsive to receipt (or viewing) of the data element. For example, the cloud computing component 102 may transmit a token to the user device 114 that causes the user device 114 to present the advertisement according to augmented reality technology. In various examples, the augmented reality technology may provide for an augmented reality session or experience at least partially via the user device 114 that is presented by any suitable augmented reality viewing application or executable code executed by the user device 114.

In some aspects, a plurality of user devices 114 may be present. Each user device 114 can communicate with the cloud computing component 102, the edge device 112, the capture device 110 as provided herein, and/or the user device(s) 114 may communicated with each other. When a plurality of user devices 114 are present, the presentation of an advertisement can be coordinated between the user devices 114. For example, and method of communicating the advertisement (e.g., a virtual reality advertisement presentation) to the user devices 114 may synchronize the advertisements for a plurality of user devices such that the presentation occurs at or around the same time, where the advertisements can have differences based on points of view of the environment. For example, users on different sides of a capture device 110 may experience the same advertisements from their unique views, though they may both occur at approximately the same time. This may create a shared viewing experience for customers near the capture device 110. When a plurality of user devices 114 associated with one or more customers is present, the advertisement may be based on criteria not associated with the customers, a common criteria of the customers, an average criteria of the customers, or only based on the criteria of a single customer of a plurality of customers.

In other examples, the cloud computing component 102 may transmit the advertisement to the user device 114 of the one or more persons at least partially through cellular technology or any other suitable communication medium that may bypass at least one of the edge device 112 or the capture device 110. Although not shown in FIG. 1, in at least some examples the capture device 110, or the display 108 may include an electronic display device that displays the advertisement, or other information supplementary or complementary to the advertisement. For example, the advertisement, or other information supplementary or complementary to the advertisement may be displayed on the electronic display of the capture device 110 or the display 108 responsive to a determination that the advertisement cannot be delivered to and/or displayed on or by the user device 114. An electronic display 108 can include any type of suitable display device including TVs, monitors, LCD displays, projectors, or the like. In some aspects, the display 108 can comprise an LED or LCD type display that can be associated with one or more panels. For example, built in door type LCD displays that may be semi-translucent can be used as the display 108. The electronic display 108 can also comprise audio output devices such as speakers, either alone or in combination with visual output devices. In some aspects, other types of output devices can form or be part of the electronic display 108. For example, lighting, air movement and other types of devices can be used.

In some aspects, the cloud computing component 102 is capable of identifying an appropriate, applicable, or otherwise suitable environmental advertisement based on the determined information. For example, the cloud computing component 102 may identify an environmental advertisement that is targeted by an advertiser to a demographic represented by one or more persons within the environment associated with the capture device 110 and/or the display 108. The cloud computing component 102 may provide the identified environmental advertisement to the environment such as a retail environment. The environmental advertisement can then be used to perform various actions within the environment such as a playing a specific audio playlist or set of advertisements, update the lighting, or the like. In some implementations, transmitting the environmental advertisement may include transmitting the content itself of the environmental advertisement. In other implementations, transmitting the environmental advertisement may include transmitting a token, identifier, or other data element that causes the user device 114 to display the environmental advertisement responsive to receipt (or viewing) of the data element. For example, the cloud computing component 102 may transmit a token to the user device 114 that causes the user device 114 to present the environmental advertisement according to augmented reality technology. In various examples, the augmented reality technology may provide for an augmented reality session or experience at least partially via the user device 114 that is presented by any suitable augmented reality viewing application or executable code executed by the user device 114. In some aspects, a The light source 106 can be any suitable light source that emits energy in the form of light within and/or outside a visible light spectrum. When the observed environment 104 is outdoor, the light source 106 may be a naturally occurring source of light, such as the sun. When the observed environment 104 is indoor, or outdoor, the light source 106 may be a manufactured source of light, such as a light bulb. For example, in various implementations the light source 106 is a fluorescent light, an incandescent light, or an LED light. The light source 106 can emit light having a luminance defined in units of lux. The luminance of the light source 106 may range from about 200 lux to about 2000 lux, where an LED light can have a luminance of up to about 2000 lux. The luminance of LED lights is, for at least some implementations of the light source 106, one or more orders of magnitude greater than the luminance of fluorescent or incandescent lights. In at least some examples, a wavelength of energy emitting from the light source 106 can be adjustable or tunable according to user input or preference. For example, when the light source 106 is an LED light, a wavelength of light emitted by the light source 106 can be adjustable or tunable to modify energy output of the light source 106. When the light source 106 is an LED light, at least some implementations of the light source 106 have peak or optimal efficiency (e.g., maximum harvestable energy output) at a wavelength of about 450 nanometers.

The display 108 can be, in some examples, a product display, a product at a retail location (e.g., on a shelf), and/or marketing materials. In some examples, the display 108 can be configured to serve as a storage apparatus for products offered for sale. In other examples, the display 108 can be configured to augment products or services offered for sale, such as being positioned proximate to such products or information regarding such services. In at least some examples, the display 108 can be a pop-up display apparatus. The display 108 may be intended as a single use apparatus that is provided to a retailer to construct within the observed environment 104. In at least some examples, the display 108 can be provided to the retailer by a vendor whose products or services correspond to visuals of the display 108. The display 108 can be, in some examples, manufactured in a manner such as to be readily assemblable with minimal instruction, investment of time, or investment of effort. Such as focus of manufacturing minimizes a cost associated to the retailer in assembling and deploying the display 108 within the observed environment 104. Although not shown in FIG. 1, in at least some examples, the display device 108 includes an electronic display capable of displaying information. An electronic display 108 can include any type of suitable display device including TVs, monitors, LCD displays, projectors, or the like. In some aspects, the display 108 can comprise an LED or LCD type display that can be associated with one or more panels. For example, built in door type LCD displays that may be semi-translucent can be used as the display 108.

The capture device 110 can be, in some examples, a computing platform capable of capturing images, processing the images, transmitting and receiving data, storing power, and wirelessly obtaining power. The capture device 110 may also be capable of capturing and processing data other than images, such as sound or other sensor data. In at least some implementations, the capture device 110 includes a system on a chip (SoC) having a processor, memory, transceiver, antenna, and camera. In some examples, the capture device 110 further includes, as a component of the SoC or coupled to the SoC, one or more sensors such as light sensors, microphones, motion sensors, heat, thermal, or temperature sensors, etc. The SoC can comprise or be coupled to a battery and a wireless power receiver. In various implementations, the wireless power receiver can be one or more photovoltaic panels, one or more magnetic coils, an antenna, etc. For example, in at least one implementation the wireless power receiver includes solar cells (e.g., dye-sensitized solar cells, crystalline solar cells, etc.) suitable for harvesting energy from the light source 106. In at least some examples, the capture device 110 can obtain or harvest power from the light source 106 to charge the battery.

At least some examples of the capture device 110 are configured to interface with the display 108 to mount or otherwise affix to the display 108. For example, the capture device 110 may be configured to affix to a back surface of the display 108, affix to a surface of the display 108 that is a part of an inner volume of the display 108, affix to a top of the display 108, and/or affix to any other suitable portion of the display 108. At least some implementations of the capture device 110 are separable such that the separated components of the capture device are capable of being affixed to the display 108 in separate areas and coupled together via one or more conductors. For example, a first portion of the capture device 110, such as the SoC, may be affixed to the display 108 in a first location. A second portion of the capture device 110, such as the battery and/or the wireless power receiver, may be affixed to the display 108 in a second location and coupled via one or more conductors to the first portion of the capture device 110. Although the system 100 illustrates only one capture device 110, in at least some implementations the system 100 includes additional or multiple capture devices 110. When multiple capture devices 110 are present, the multiple capture devices 110 can be associated with multiple displays 108. In some embodiments, multiple capture devices 110 can be arranged to capture different angles of a single display 108 and/or product, and/or multiple capture devices 110 can be arranged at different locations in an observed environment to capture images for multiple products at a time. The multiple capture devices 110 can be connected to the same or different edge devices 112.

The edge device 112 can be, in some examples, a computing platform or other processing device capable of processing images, transmitting and receiving data via wireless and/or wired communication, and storing data. To process the images, in at least some examples, the edge device 112 is capable of performing processing according to artificial intelligence algorithms, for example, to derive or determine demographic or other information from images or data sets, determine demographic or other information of recorded audio, etc. Some implementations of the edge device 112 are further capable of exerting a measure of control over the capture device 110, such as controlling when the capture device 110 captures and/or transmits images or other data, performing power or other management of the capture device 110, hosting a management or other graphical user or command line interface for the capture device 110, etc., as described in more detail herein. In some examples, the edge device 112 functions as a bridge or access point to facilitate communication between the capture device 110 and the cloud computing component 102. For example, some implementations of the edge device 112 can include cellular communication functionality such that the edge device 112 includes, or is, a long-term evolution (LTE) access point. The inclusion of cellular communication functionality can, in some examples, enable the edge device 112 to communicate with the cloud computing component 102 without requiring, or relying on, a network infrastructure of an observed environment. While a single edge device 112 is shown in FIG. 1, in some examples the system 100 may include multiple edge devices 112. For example, multiple edge devices 112 may be distributed in the observed environment 104, with each edge device 112 within communication range of at least one other edge device 112. In this way, the multiple edge devices 112 may form, or function as, a mesh network. In at least some examples, the edge devices 112 may remain active and accessible even if there is no display 108 or capture device 110 located in, or operating in, the observed environment at a given point in time. This may facilitate at least some of the edge devices 112 being used as optional retail access points for wireless internet connectivity for consumers, guests, and/or other eligible (e.g., licensed, registered, etc.) third parties.

In an example of operation of the system 100, the capture device 110 can acquire images and transmit those images to the edge device 112. While operation of the capture device 110 in the system 100 is described with respect to capturing and processing, transmission, or other handing of images, it should be understood that similar functional actions may be applicable for other data (e.g., audio, sensor data, etc.). The acquisition and transmission of images may be on a predetermined schedule, on command, or triggered based on the occurrence of a specified event or criterion. In some implementations, the capture device 110 can acquire images based on an output of a sensor, such as indicating the possible or probable presence of a person in view of the capture device 110. In other implementations, the capture device 110 can acquire images based on a predetermined schedule, such as a number of images per second, a number of images per minute, a number of images per hour, a number of images per day, or any other suitable schedule. In at least some examples, the predetermined schedule is programmable by accessing a control interface of the capture device 110 via the edge device 112 or directly via the capture device 110 itself. In yet other implementations, the capture device 110 can acquire images on command, such as upon or responsive to receipt of a command received from the edge device 112 to capture one or more images.

The capture device 110 may be controlled to capture and/or transmit images at an interval that enables the capture device 110 to operate for approximately a predetermined time for a given energy storage capacity of the battery and/or energy harvesting or reception capacity of the wireless power receiver. For example, the wireless power receiver may be capable of providing the capture device with a first amount of power over a given time interval. The capture device 110 may consume a second amount of power to capture an image, process the image to generate a track record, and/or transmit the image to another device. Based on a desired time interval for operation of the capture device 110, a frequency with which the capture device 110 captures images, process the images to generate track records, and/or transmit the images to another device may be controlled. For example, the capture device 110 may be programmed or controlled such that the first amount of power is greater than the second amount of power multiplied by a number of images captured, processed, and/or transmitted. In at least one example, the capture device 110 is suitable for, and capable of, capturing one image per second for a 12-hour period (e.g., when the light source 106 is an indoor light source other than a LED light). In another example, the capture device 110 is suitable for, and capable of, capturing one image per second for a 24-hour period (e.g., when the light source 106 is a LED light).

In at least some examples, prior to transmitting the images to the edge device 112 the capture device 110 performs some amount of processing on the images (e.g., referred to as pre-processing when additional processing will later be performed on the images by another device such as the edge device 112 and/or cloud computing component 102). For example, at in some implementations, the capture device 110 processes the images to attempt to determine on or more characteristics based on the images. The capture device 110 may process the images to perform facial detection, determine whether a person depicted in the images is viewing an area of interest of the display 108, etc.

After processing the images, in some examples the capture device 110 transmits the images to the edge device 112. In other examples, after processing the images the capture device 110 transmits the images to the cloud computing component 102 or any other suitable computing device. Alternatively, after processing the images, in some examples, the capture device 110 discards the images and/or does not transmit the images. For example, when the processing indicates that the images do not contain additional data useful for determining metrics relates to the person depicted in the images, the capture device 110 may not transmit the images. By performing processing on the capture device 110 to determine whether the images contain additional data useful for determining metrics relates to the person depicted in the images and not transmitting the images when they do not contain additional useful data, the capture device 110 can increase the efficiency of its power consumption. For example, by not transmitting images from which no additional useful data can be obtained, the capture device 110 can preserve the power that would otherwise have been expended in performing the transmissions. This preservation of power extends a usable period of time of the capture device 110 for a given charge of the battery of the capture device 110.

In at least one example, additional useful data, in the above context, is data that will, or may, lead to the identification or determination of characteristics or metrics not otherwise known in the absence of the additional data. For example, as discussed above, one metric for determination is dwell time. If the dwell time is of interest up to a predetermined value, and no other metrics are of interest, images depicting dwell time of the same consumer beyond the predetermined value may not yield additional useful data. Similarly, if consumer gender is of interest, and no other metrics are of interest, images depicting the same consumer after the gender of that consumer has been determined may not yield additional useful data. Thus, by determining that these images do not contain additional useful data and not transmitting them from the capture device 110, the capture device reduces power consumption.

As discussed above, in at least some implementations of the system 100, the edge device 112 exerts a measure of control over the capture device 110. For example, the edge device 112 may transmit one or more commands to the capture device 110. The commands may instruct the capture device 110 to perform any suitable function, at least some of which may include specifying a frame rate of the capture device 110, specifying an image capture rate of the capture device 110, instructing the capture device 110 to capture images when motion is detected, specifying a schedule for the capture device 110 to capture images, specifying a resolution of the captured images, etc. In at least some examples, the edge device 112 further transmits an indication to the capture device 110 of whether the edge device 112 has received sufficient images to determine desired characteristic or metrics. Based on this indication, the capture device 110 may cease transmitting certain images to the edge device 112, as discussed above.

Based on the processing performed by the capture device 110, in at least some examples the capture device 110 and/or the edge device 112 can generate a track record. The track record can include information about the images and/or the capture device 110 associated with the captured images. For example, the track record can include one or more of an identification of the capture device 110, status information related to the capture device 110, an indication of consumer engagement with the capture device 110 and/or a display 108 to which the capture device 110 is affixed, a gender of the consumer, an age of the consumer (or age category, such as youth, adult, or senior), an ethnicity of the consumer, a mood of the consumer, and/or objects carried or worn by the consumer. At least some of the data included in the track record can be associated with a level of confidence in an accuracy of the data, where the level of confidence can also be included in the track record. After generating the track record, in at least some examples, the capture device 110 can transmit the track record to the edge device 112 and/or the cloud computing component 102. In some examples, the edge device 112 can generate and/or supplement the track record. In some implementations of the system 100, when the capture device 110 determines that all characteristics or metrics of interest for an image have been determined and recorded in the track record, the capture device 110 may transmit the track record to the edge device 112 and/or the cloud computing component 102 without transmitting the image from which the capture device 110 derived the track record.

In at least some examples, the edge device 112 receives the images transmitted by the capture device 110. The images are received according to any suitable short-range or long-range wireless communication protocol supported by both the capture device 110 and the edge device 112. In some implementations of the system 100, the edge device 112 transmits the received images to the cloud computing component 102 without processing the received images. In other implementations of the system 100, the edge device 112 processes the images received from the capture device 110 prior to transmission to the cloud computing component 102.

In at least some examples, the processing includes artificial intelligence processing to identify characteristics and/or metrics related to the images or consumers depicted by the images. For example, the edge device 112 may process the images to determine one or more demographic identifiers such as any one or more of a gender of a consumer, an age of the consumer, an ethnicity of the consumer, a level of engagement of the consumer with the display 108, a mood, sentiment, or feeling of the consumer, and/or information regarding accessories worn or carried by the consumer. The level of engagement of the consumer can include determining whether or not the consumer is facing the capture device 110 and/or the display 108, a proximity of the consumer to the capture device 110 and/or the display 108, and/or a dwell time of the consumer in front of, in view of, or in a certain position in relation to the capture device 110 and/or the display 108. In other examples, the edge device 112 may further process the images to determine any other suitable characteristics or metrics based on contents of the images.

In at least some examples, the edge device 112 can receive the images in a time-spaced manner that does not approximate video. The edge device 112 may process the images to approximate a video stream based on the images. For example, the edge device may perform statistical sampling and/or artificial intelligence processing to approximate a video stream based on the images received from the capture device 110.

In some implementations of the system 100, the edge device 112 also receives a track record from the capture device 110, where a track record is received for, and corresponds to, each received image. In other implementations of the system 100, the edge device 112 receives a track record from the capture device 110 without receiving an image. When the edge device 112 receives a track record associated with a received image, in at least some examples the edge device 112 may modify the track record based on processing of the image by the edge device 112. For example, when the edge device 112 receives the track record associated with a received image from the capture device 110, the track record may include information about the capture device 110, as well as results of at least some pre-processing performed by the capture device 110. As the edge device 112 performs further processing on the received image, the edge device 112 updates the track record associated with the image to reflect results of the processing of the image in the track record of the image. The edge device 112 may receive track records from multiple capture devices 110 within a same general location, such as in a same store, a same structure, etc., and/or receive multiple track records from a single capture device 110. The edge device 112, in at least some examples, generates a track file that collates the data from the various received track records.

In at least some examples, the edge device 112 transmits images, track records, and or a track file to the cloud computing component 102. In some examples this transmission is performed on a scheduled basis such that the transmission comprises a batch of images and/or track records. In other examples, the transmission is performed for each image and/or track record received by the edge device 112 with the track file being transmitted separately on a scheduled basis. When the edge device 112 has performed some processing of the image, but further processing is to be performed by the cloud computing component 102, the edge device 112 may transmit both the image and its track file to the cloud computing component 102. Alternatively, when the edge device 112 determines that all characteristics or metrics of interest for an image have been determined and recorded in the track record, the edge device 112 may transmit the track record to the cloud computing component 102 without transmitting the image associated with the track record. Yet further alternatively, in some examples the edge device 112 may not transmit images or track records to the cloud computing component 102. Instead, the edge device 112 may transmit the track file to the cloud computing component 102 without including the underlying images or track records from which the track file was derived.

In at least some examples, the cloud computing component 102 receives data from the edge device 112 (or a plurality of edge devices 112). In other examples, the cloud computing component 102 receives data directly from the capture device 110 (or a plurality of capture devices 110). The received data can include images captured by the capture device 110, track records generated by the capture device 110, track records modified by the edge device 112, and/or track files generated by the edge device 112. The cloud computing component 102, in at least some examples, generates one or more track folders that collate the data from at least some of the various received track files (e.g., such as received track files matching filtering criteria of the cloud computing component 102). Based on the track folders, the cloud computing component 102 generates and outputs reporting information. For example, the cloud computing component 102 may analyze the contents of the track folders and output reporting information to a display screen or user interface in a human readable manner.

In at least some examples, the cloud computing component 102 further performs processing of the received data. The processing is, in some examples, artificial intelligence processing. The processing can include processing of images, processing of track records, processing of track files, or processing of track folders derived from the received data. The processing can, for example, determine demographic information of a consumer depicted in an image received by the cloud computing component 102. In other examples, the processing can reveal trends or other insights related to data received in a plurality of track records and or in track files. In yet other examples, the processing can reveal trends or other insights related to the track records. Further, based on the processing, in some examples, the cloud computing component 102 determines and transmits one or more control signals to the edge device 112 and/or the capture device 110. The control signals, in various examples, may control what processing is done by the capture device 110 and/or the edge device 112, what information is included in a track record and/or a track file, a frequency of image capture of the capture device 110, or any other suitable parameter of operation of the capture device 110 and/or the edge device 112.

In some examples, the cloud computing component 102 performs one or more additional functions. For example, the cloud computing component 102 may host or otherwise provide a portal (e.g., a software construct) that enables a user to estimate costs, order, and/or purchase the display 108 the capture device 110, the edge device 112, and/or other point-of-sale or marketing related items, provide settings or other input for the capture device 110, and/or review data captured, determined, calculated, or otherwise provided by the capture device 110, the edge device 112, and/or the cloud computing component 102. For example, a user may interface with the portal to register an account for use in conjunction with a capture device 110. The user may register the account via a digital identity, such as a digital identity stored on, and managed by, a blockchain, Hyperledger, or other form of immutable and trusted digital construct. In at least some examples, the digital identity may enable the user to register the account for use in conjunction with a capture device 110 while also maintaining anonymity and full control and ownership of data of the user.

Once registered, the user may access the portal to perform various functions. For example, the user may access the portal to order the display 108 and/or the capture device. In at least one implementation, the user may access the portal to identify a third-party printer to produce the display 108 and include, embed, or otherwise implement the capture device 110 with the display 108. In some examples, the portal may provide mechanisms for the user to upload and provide graphics or other data to the third-party printer. In some examples, the portal may also provide mechanisms for the user to pay the third-party printer via the portal. In various other implementations, the portal may enable the user to interact with other third-parties, such as to contract with the third-parties for services, goods, or data, either to be received by, or provided by, the user.

The user may also access the portal to review data, such as a data profile that may relate to the observed environment 104, a particular retailer, a particular type of products, a particular demographic, etc. For example, the user may access the portal to review data provided by a vendor, data provided by a retailer, or data provided by any other suitable third-party or source to determine insights about demographics in a certain environment (e.g., such as the observed environment 104 while the user is evaluating whether to place the display 108 with the capture device 110 in the observed environment 104). In other examples, the user may access the portal to review data captured by, or derived from data captured by, a capture device 110 purchased by, and currently or previously deployed in the observed environment 104 on instruction of, the user. The data may be for a capture device 110 currently deployed in an observed environment 104, as well as data from capture devices that were previously, but are no longer, deployed, or which have been redeployed in a different environment. Generally, at least some of the demographic information and insights determinable and/or obtainable based on the teachings of this disclosure may be provided or accessible via the portal. In some examples, the portal may be implemented as a plugin to an Internet web browser software application.

The user may also access the portal to provide input to, or change settings of, a capture device 110. For example, the user may control a frequency with which the images capture device 110 captures images, what demographics are tracked, monitored, or otherwise determined based on the images captured by the capture device 110, a retention time for data captured by, or determined based on data captured by, the capture device 110, etc.

In some examples, the user may also provide advertisements, environmental advertisements, or information that facilitates acquisition of advertisements by the cloud computing component 102, for placement in the observed environment 104. The user may also provide targeting data for targeting placement of the advertisements. For example, the user may provide an identification of one or more demographics to which the advertisement is to be targeted. Based on the received targeting data and advertisements, responsive to determining the demographic information, the cloud computing component 102 may provide or place an appropriate advertisement in the observed environment 104. An appropriate advertisement may be an advertisement that has or is associated with targeting data that has a sufficient (e.g., greater than or equal to threshold) amount of overlap with determined demographics for a consumer, the demographics being determined as described above. In at least some examples, other data may be considered in determining an appropriate advertisement and/or an environmental advertisement, such as local weather data, time of day, day of week, month of year, upcoming or recently passed social events (e.g., concerts, sporting events, etc.), and the like.

In some examples, the cloud computing device 102 places the advertisement by transmitting the advertisement to the edge device 112, which in turn transmits the advertisement to the capture device 110, which transmits the advertisement to the user device 114, as described above herein. In some examples, the advertisement, or other information related to the advertisement, is instead, or additionally, displayed on an electronic display device of the display 108 and/or capture device 110. In some examples, the cloud computing device 102 places the advertisement by transmitting the advertisement to the edge device 112, which in turn transmits the advertisement to the user device 114, as described above herein. In some examples, the cloud computing device 102 places the advertisement by transmitting the advertisement to the user device 114, as described above herein. The advertisement may be placed to the user device 114 in a just-in-time manner, as described above herein. In some examples, transmitting the advertisement includes transmitting data representing the content of the advertisement (e.g., text, images, etc.) In other examples, transmitting the advertisement includes transmitting a token or other identifier, based on which the user device 114 obtains the advertisement from any suitable source via any suitable communications. In other examples, transmitting the advertisement includes transmitting a token or other identifier that causes the user device 114 to present the advertisement according to augmented reality technology (e.g., to initiate or otherwise launch an augmented-realty session or experience). In some examples, the capture device 110 functions as an augmented-reality beacon. For example, the capture device 110 may broadcast or otherwise periodically transmit a data element (e.g., token, identifier, key, etc.) that, responsive to receipt, causes the user device 114 to initiate or otherwise launch an augmented-realty session or experience that at least partially includes elements of the display 110.

In some examples, the cloud computing device 102 can place an environmental advertisement by transmitting the environmental advertisement to the edge device 112, which can be in signal communication with one or more environmental controls such as audio controls for the environmental, lighting controls, and/or other environmental controls. In some examples, transmitting the environmental advertisement includes transmitting data representing the content of the environmental advertisement (e.g., text, images, etc.) In other examples, transmitting the environmental advertisement includes transmitting a token or other identifier to the edge device via any suitable communications.

While the edge device 112 is generally described herein as interacting with the capture device 110 and/or the cloud computing component 102, the edge device 112 may have additional functions or capabilities. For example, as described above, multiple edge devices 112 may be present in an observed environment 104 and arranged so as to form or function as a mesh network. Third-parties may license access to use the edge devices 112. For example, a third-party may use the mesh network as a communication backbone to provide services to consumers in the observed environment 104. As one example, a user may enter the observed environment 104 with a smartphone or other electronic device (e.g., such as the user device 114) and may launch an application on the electronic device. Conventionally, the user may search for available connections via a menu of the electronic device and may select a network provided by a retailer or other party responsible for the observed environment 104. In this way, the network used by consumers may be provided and maintained by the retailer. However, certain third-parties may wish to provide Internet-based services to users in the observed environment 104 while not using the network provided by the retailer. Additionally, the retailer may incentivize third-parties to use a network other than the network provided by the retailer, such as to reduce a resource load of the network provided by the retailer.

In some implementations, the third-party may contract with a provider of the edge device 112 to use the edge device 112 for communication in place of the network provided by the retailer. In such implementations, the application executing on the consumer's electronic device may determine that the edge device 112 is present and may communicate, such as with the cloud computing component 102 or another device, via the edge device 112.

In some aspects, a plurality of capture devices 110 may be present within an area and the capture devices 110 may be associated with one or more edge devices 112. The capture devices 110 can be segmented for various reasons into different groups. For example, difference advertisers may be associated with different capture devices 110 throughout a store, or a single advertiser may segment the capture devices 110 based on product type, store type, or the like. The data captured by the capture devices 110 may also be segmented corresponding to the segmentation of the capture devices 110. The selection of an advertisement (e.g., a static ad, a banner display, a virtual reality display, etc.) may be chosen based on information using the segmented data from the segmented capture devices 110. This may allow for different entities associated with each segment to select advertisements based on data obtained from the selected capture devices 110.

When a plurality of capture devices 110 are present and the capture devices 110 are segmented, the capture devices 110 may be associated with the same edge device 112, and/or the same cloud computing component 102. The data generated by each segment may be managed to be within the same security environment so that the data is private between the segments. For example, the segmented data may be protected using the same security system or key so that each set of segmented data is private and secured from other segmented data. The various algorithms as described herein can be commonly used for the segmented data, where the algorithms can separately process the data based on segment and segment security standards. Similarly, ad selections and placements can be communicated through the network in a segmented fashion. The data used to select the ad can be based on the segmented data. The communication channels may be similar or the same (e.g., the same edge device 112, the same cloud environment 102, etc.), but the use of a segmented security may allow the advertisements and other data sent back to and/or through the capture device 110 to be separated from other segments.

Figure 2:
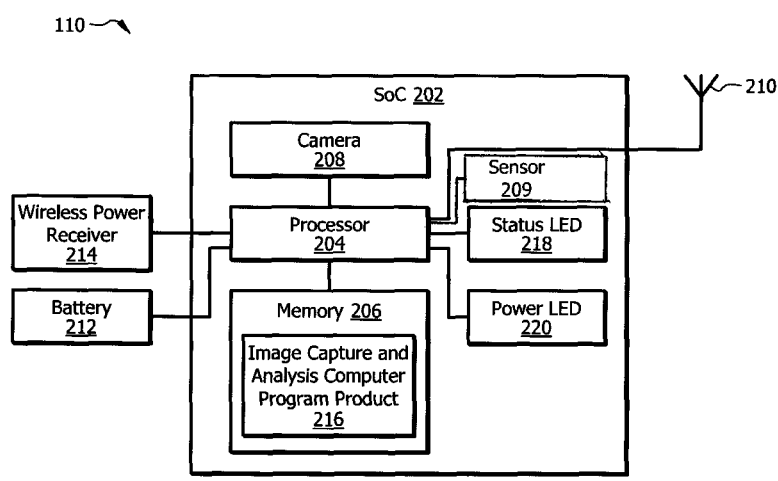
FIG. 2 is a block diagram of an illustrative capture device in accordance with aspects of the present disclosure.

Referring now to FIG. 2 a block diagram of an illustrative implementation of the capture device 110 in accordance with various examples is shown. In at least one example, the capture device 110 can include a system on a chip (SoC) 202 that includes a processor 204, a memory 206, a camera 208, a sensor 209, and an antenna 210. The camera 208 is a device of any process technology suitable for capturing an image, the scope of which is not limited herein. In some embodiments, the images captured by the camera 208 can be in the format of analog images or digital images, which can include one or more image frames. In some embodiments, the capture device 110 can directly generate digital image frames. To capture the image of the people, the camera 208 can be positioned to capture images of an area where the viewers of the products or the people being observed are generally expected to be. In some embodiments, the capture device 110 may include more than one camera 208. The sensor 209 is a device of any process technology suitable for capturing data, the scope of which is not limited herein. For example, the sensor 209 may be a microphone (e.g., audio sensor), heat, thermal, or temperature sensors, such as an ultra-low-power thermal imaging sensor, motion sensor(s) (e.g., vibration sensors, accelerometers, etc.), light sensors, proximity sensors, or the like. In some embodiments, the capture device 110 may include more than one sensor 209. The capture device 110 further includes a battery 212 and a wireless power receiver 214.

The memory 206, in some implementations, includes a capture and analysis computer program product 216. The capture and analysis computer program product 216, in at least some examples, controls operation of the SoC 202 to cause the SoC 202 to capture images or other data via the camera 208 and/or sensor 209, process the captured data via the processor 204, such as according to one or more artificial intelligence algorithms or processes, and transmit the captured data and/or a result of the processing (e.g., such as a track record) via the antenna 210. The capture and analysis computer program product 216 is programmable or otherwise modifiable, such as by the edge device 112 and/or the cloud computing component 102, to modify operation of the capture device 110. In some examples, the SoC 202 further includes a status LED 218 and a power LED 220.

The processor 204 can serve to allow the various functions and controls on the capture device 110 to be performed along with controlling the communication interface used by the capture device 110 to communicate with the edge device and/or cloud computing component 102. The processor 204 may be a regular computer, a special purpose computer, or a specialized microcontroller such as a low power processor used to provide control and processing functions with a lower power consumption on the device.

In at least some examples, and as used for the purposes of description hereinafter, the wireless power receiver 214 comprises one or more solar power cells arranged into a solar power panel. In at least some examples, the solar power cells are dye sensitizes solar cells that facilitate harvesting energy from indoor light sources such as fluorescent, incandescent, and/or LED lights. In at least some examples, the processor 204 is coupled to the memory 206, the camera 208, the sensor 209, the antenna 210, and the battery 212. In at least some examples, the processor 204 is further coupled to the wireless power receiver 214. The battery 212, in at least some examples, further couples to the wireless power receiver 214.

When the wireless power receiver 214 comprises one or more solar power cells, an energy harvesting capacity of the wireless power receiver 214 may be directly proportional to a surface area of the wireless power receiver 214. For example, a wireless power receiver 214 having a first surface area has a capacity for harvesting a greater amount of energy than another wireless power receiver 214 having a second surface area smaller than the first surface area. In at least one example of the wireless power receiver 214 implemented as solar power cells, each solar power cell is approximately 12 millimeters (mm)×100 mm in size. In that example, each solar cell is capable of harvesting or generating approximately 0.3 milliwatts (mW) of power in an environment with lighting having a luminance of about 1000 lux (such as an environment lit by incandescent or fluorescent light) and approximately 0.6 mW of power in an environment having a luminance of about 2000 lux (such as an environment lit by LED light). Also, in that example, each solar cell is capable of generating a direct current voltage of about 0.5 volts (V). The solar power cells may be configured and coupled together in a multi-cell configuration to increases a power and voltage generation capability of the multi-cell configuration. Given a multi-cell configuration of 10 solar power cells, the wireless power receiver 214 would be capable of generating or harvesting about 3 mW per hour of power from a light source at about 1000 lux and about 6 mW per hour of power from a light source at about 2000 lux, each with a voltage of about 5 V.

The wireless power receiver 214 can be somewhat remote from the capture device 110. For example, the wireless power receiver 214 can be placed in a location accessible by light, such as on top of a shelf or display (e.g., such as the display 108 of FIG. 1). A wire or other connection can then be used to connect the wireless power receiver 214 to the capture device 110. This allows for positioning of the wireless power receiver 214 in a position to harvest power while allowing the capture device 110 to be placed in a position to capture information as desired.

In at least some examples, the SoC 202 can be an ESP-EYE computing platform such that the processor 204 is a TENSILICA LX6 processor with WI-FI and BLUETOOTH functionality and the camera 208 includes a 2-megapixel sensor (e.g., the camera 208 is a 2-megapixel camera). With this configuration, in at least some examples the SoC 202 consumes about 62 mW-hour (mWhr) of power per day when capturing, processing, and transmitting one image per minute over a 12-hour period of time. For the wireless power receiver 214 discussed above and capable of generating 3 mW of power, the wireless power receiver 214 generates or harvests about 72 mWhr of power per 24-hour period when exposed to light of an illuminance of 1000 lux for the same period. Thus, the power requirement of the SoC 202 is less than the power suppliable by the wireless power receiver 214 comprising 10 solar power cells. For the wireless power receiver 214 discussed above and capable of generating 6 mW of power, the wireless power receiver 214 generates or harvests about 144 mWhr of power per 24-hour period when exposed to light of an illuminance of 2000 lux for the same period. This increased power harvesting facilitates operation of the SoC 202 for a longer period of time (e.g., about 24 hours) when capturing, processing, and transmitting 1 image per second, or enabling the SoC 202 to capture, process, and transmit more than 1 image per second.

Although not illustrated, in at least some examples the capture device 110 further includes cellular communication functionality, such as an LTE modem. When the capture device 110 includes cellular communication functionality, the capture device 110 may communicate with the cloud computing component 102 without using the edge device 112 as a bridge. Accordingly, in at least some examples in which the capture device 110 includes cellular communication functionality, the edge device 112 of the system 100 may be omitted. The capture device 110 can include and/or communicate using cellular communication functionality when a power consumed by the using the communication functionality, combined with a power consumed by other components of the SoC 202, does not exceed a power harvested or generated by the wireless power receiver 214 in a given time period.

Figure 3:
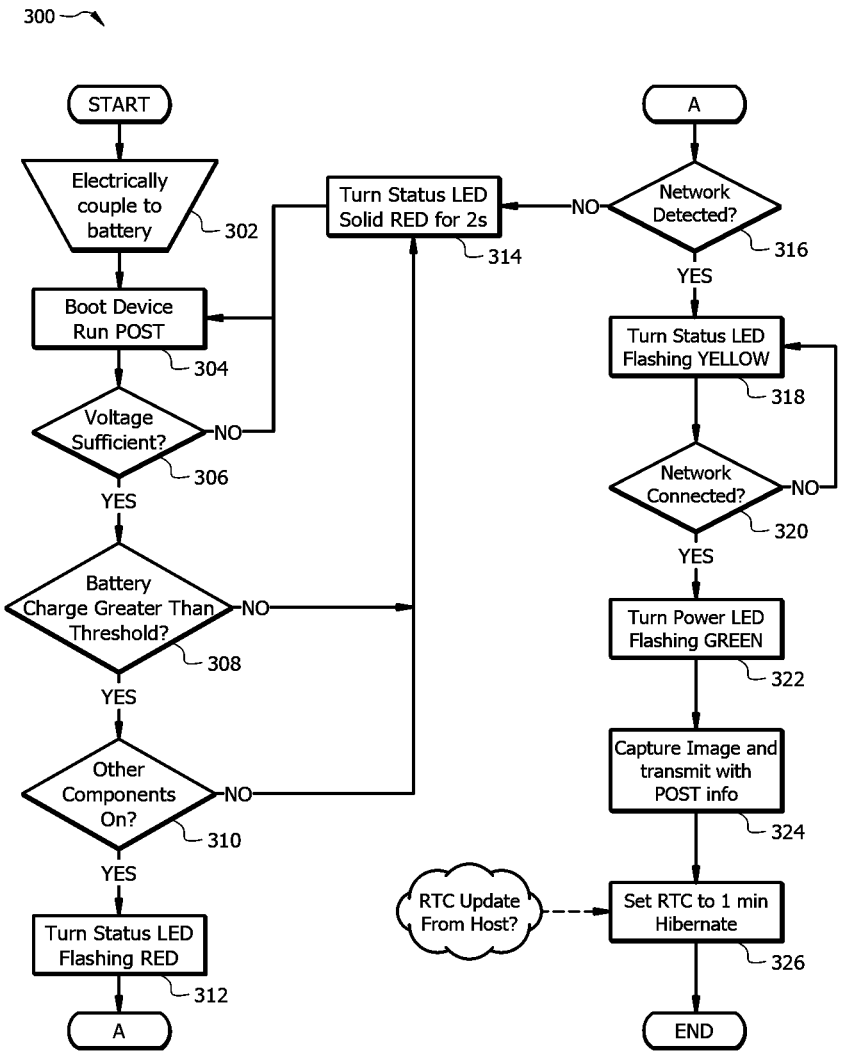
FIG. 3 is a flowchart of an illustrative device initialization method in accordance with aspects of the present disclosure.

Referring now to FIG. 3 a flowchart of an illustrative method 300 in accordance with various examples is shown. The method 300 is, in at least some examples, a method of initialization of the capture device 110. The method 300 is executed, in some examples, when the capture device 110 is first activated or powered-on.

At operation 302, the battery 212 can be electrically coupled to the capture device 110. In some examples, the battery 212 can be electrically coupled to the capture device 110 by a user removing anon-conductive isolator from between adjacent electrical contacts of the capture device 110 and the battery 212. The non-conductive isolator can be, for example, a pull tab or tape. In other examples, the battery 212 is electrically coupled to the capture device 110 by connecting an electrical conductor (e.g., a wire or cable) between the battery 212 and the capture device 110.

At operation 304, the capture device 110 powers on and initializes a power on self-test (POST). At operation 306, the capture device 110 determines whether a received system voltage is sufficient for normal operation of the capture device 110. When the received voltage is sufficient for normal operation of the capture device 110, the method 300 proceeds to operation 308. When the received voltage is not sufficient for normal operation of the capture device 110, the method 300 returns to operation 304.

At operation 308, the capture device 110 determines whether a charge of the battery 212 is greater than a predetermined threshold. In at least some examples, the predetermined threshold can be about five percent, or the predetermined threshold can represent a minimum operating voltage supplied by the battery to indicate a level of charge. When the battery charge is greater than the predetermined threshold, the method 300 proceeds to operation 310. When the battery charge is not greater than the predetermined threshold, the method 300 proceeds to operation 314.

At operation 310, the capture device 110 determines whether other components of the capture device 110 are turned-on. These other components can include, for example, the camera 208 and/or a communication interface (e.g. radio) of the SoC 202. When the other components of the capture device 110 are turned-on, the method 300 proceeds to operation 312. When the other components of the capture device 110 are not turned-on, the method 300 proceeds to operation 314

At operation 312, the capture device 110 causes the status LED 218 to indicate that the capture device 110 is active (e.g., the LED 218 can flash red, remain on, etc.). After activating the status LED 218 and causing the status LED 218 to indicate an operating state, the method 300 can proceed to operation 316.

At operation 314, the capture device 110 can cause the status LED 218 to turn on having a red color for a predetermined period of time before turning off. In at least some examples, the predetermined period of time is about two seconds. After turning off the status LED 218, the method 300 returns to operation 304.

At operation 316, the capture device 110 determines whether a wireless network is detected. The wireless network may be of any suitable short-range or long-range protocol. When a network is not detected, the method 300 returns to operation 314. When a network is detected, the method 300 proceeds to operation 318.

At operation 318, the capture device 110 causes the status LED 218 to indicate that a network is detected (e.g., flash yellow, remain yellow or a different color, etc.). Alternatively, in some examples, the capture device 110 causes a different LED to flash yellow or indicate that a network is detected. After activating the status LED 218 and causing the status LED 218 to indicate that a network is detected, the method 300 proceeds to operation 320.

At operation 320, the capture device 110 determines whether it is communicative connected to the network detected at the operation 316. When the capture device 110 is not communicatively connected to the network, the method 300 returns to operation 318. When the capture device 110 is communicatively connected to the network, the method 300 proceeds to operation 322.

At operation 322, the capture device 110 causes the power LED 220 to indicate an active state of the capture device 110 (e.g., flash green, remain green, etc.). After activating the power LED 220 and causing the power LED 220 to indicate that the capture device 110 is working, the method 300 proceeds to operation 324.

At operation 324, the capture device 110 captures an image via the camera 208 and transmits the image with a result or report of the POST. In at least some examples, the transmission is to the cloud computing component 102. In other examples, the transmission is to the edge device 112. In some implementations, the capture device 110 can process the image prior to transmission to determine one or more characteristics or metrics and generate a track record, as discussed in greater detail elsewhere herein. In such examples, the capture device may include the track record in the transmission. After the capture device 110 sends the transmission, the method 300 proceeds to operation 326.

At operation 326, the capture device 110 sets RTC to one minute. After setting RTC to one minute, in at least some examples, the capture device enters a hibernation. Entering hibernation, in at least some examples, preserves power of the capture device 110.

Figure 4:
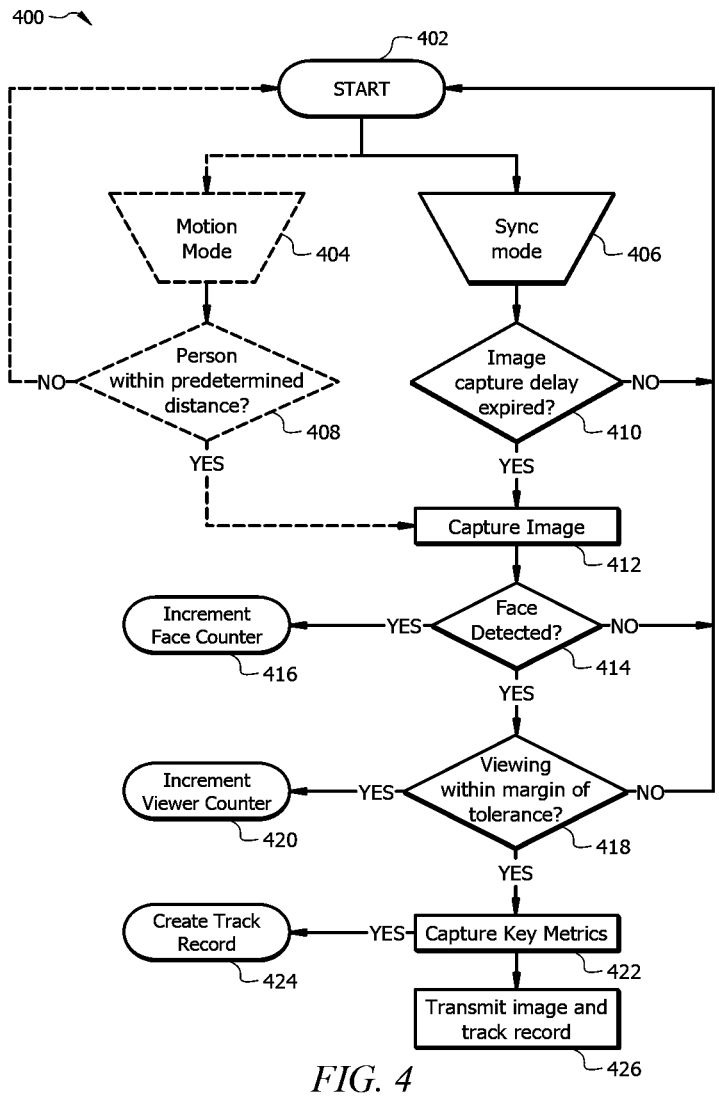
FIG. 4 is a flowchart of an illustrative method of image capture and processing in accordance with aspects of the present disclosure.

Referring now to FIG. 4 a flowchart of an illustrative method 400 in accordance with various examples is shown. The method 400 is, in at least some examples, a method of image capture and processing. The method 400 is, in some examples, performed by the capture device 110. In other examples, the method 400 is performed partially by the capture device 110 and partially by the edge device 112.

At operation 402, the capture device 110 begins operation and the method 400 proceeds to either operation 404 or operation 406. For example, when the capture device 110 is configured for capturing images based on motion detection, sometimes referred to as a motion mode, the method 400 proceeds to operation 404. When the capture device 110 is configured for timed captured of images, sometimes referred to as a sync mode, the method 400 proceeds to operation 406. At operation 404, the capture device 110 initializes the motion mode and the method 400 proceeds to operation 408.

At operation 406, the capture device 110 initializes the sync mode and the method 400 proceeds to operation 410. At operation 410, the capture device 110 determines whether a delay period between capturing images has expired (e.g., whether an elapsed time since a last image was captured has reached a predetermined threshold value). When the delay period between capturing images has not expired, the method 400 returns to operation 402. When the delay period between capturing images has expired, the method 400 proceeds to operation 412.

Returning to operation 408, the capture device 110 determines whether a person is within a predetermined distance of the capture device 110. In at least some examples, the predetermined distance is about 5 feet, within about 10 feet, or without about 15 feet, though other distances can be used as thresholds as selectably set by the system. When a person is not within the predetermined distance of the capture device 110, the method 400 returns to operation 402. When a person is within the predetermined distance of the capture device 110, the method 400 proceeds to operation 412. At operation 412, the capture device 110 captures an image and the method 400 then proceeds to operation 414.

Alternatively, when the capture device 110 does not perform processing or pre-processing of the image captured at the operation 412, the method 400 proceeds from operation 412 to operation 426, omitting intervening operations. In such examples, the following operations 414 through 426 may be performed by the edge device 112. In examples of the method 400 in which the capture device 110 performs processing or pre-processing of the image captured at the operation 412, at least some of the following operations 414 through 426 may be performed by the capture device 110.

At operation 414, the image captured at operation 412 is processed to determine whether a face is detected in the captured image. The processing is performed, in at least some examples, according to artificial intelligence and/or facial detection algorithms. When a face is not detected in the image, the method 400 returns to operation 402. When a face is detected in the captured image, a face counter is incremented at operation 416 and the method 400 proceeds to operation 418. The face counter, in at least some examples, is an incremental counter that tracks a number of faces detected in images captured by the capture device 110.

At operation 418, the image captured at operation 412 is processed to determine whether the face that was detected at operation 414 is viewing the capture device 110 within a margin of tolerance. In at least some examples, the tolerance is plus or minus between about 1 and 10 degrees, or about five degrees. The processing is performed, in at least some examples, according to artificial intelligence algorithms. When the face is not viewing the capture device 110, the method 400 returns to operation 402. When the face detected at operation 414 is viewing the capture device 110, a viewer counter is incremented at operation 420 and the method 400 proceeds to operation 422. The viewer counter, in at least some examples, is an incremental counter that tracks a number of viewers captured in images viewing an area around the capture device 110 within the margin of tolerance.

At operation 422, key metrics can be captured and a track record can be generated at operation 424. After generating the track record, the method 400 proceeds to operation 426. At operation 426 the track record generated at operation 424, and in some examples the image captured at operation 412, are transmitted. In some examples, the transmission is from the capture device 110 to the edge device 112. In other examples, the transmission is from the capture device 110 to the cloud computing component 102. In yet other examples, the transmission is from the edge device 112 to the cloud computing component 102. In yet further examples, the operation 426 is omitted, such as when the edge device 112 performs the operation 416 to the operation 424 and the edge device 112 will continue to perform additional processing on the image captured at operation 414.

Figure 5:
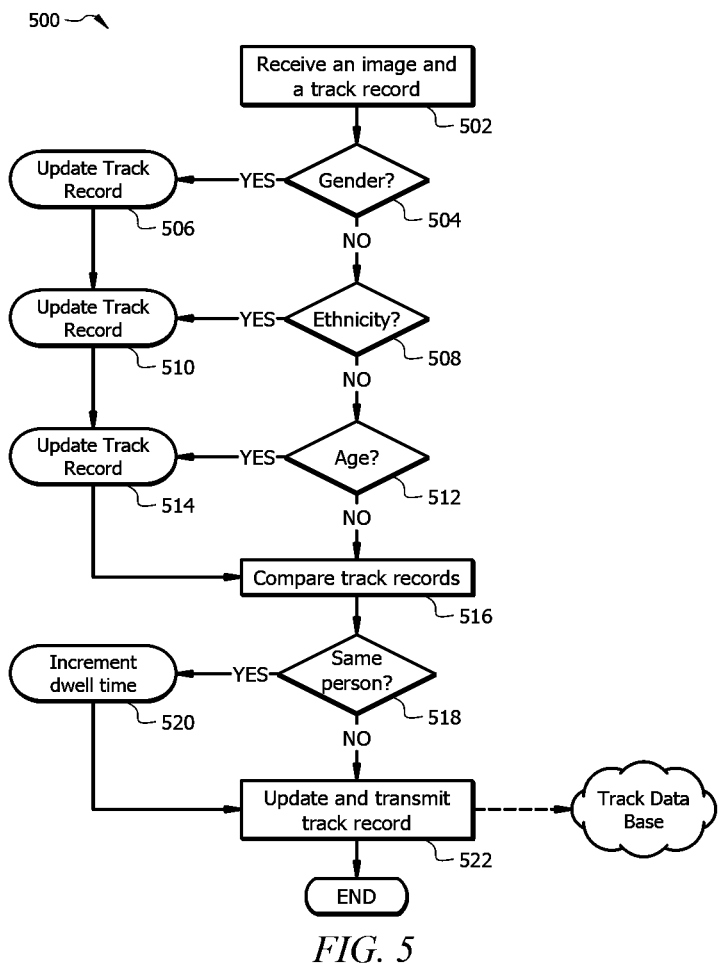
FIG. 5 is a flowchart of an illustrative method of image processing in accordance with aspects of the present disclosure.

Referring now to FIG. 5 a flowchart of an illustrative method 500 in accordance with various examples is shown. The method 500 is, in at least some examples, a method of image processing. The method 500 is, in some examples, performed by the edge device 112. In other examples, the method 500 is performed partially by the edge device 112 and partially by the cloud computing component 102. In yet other examples, the method 500 is performed by cloud computing component 102.

At operation 502, an image and a track record are received. In at least some examples, the image and the track record are received by the edge device 112 from the capture device 110. In other examples, the image and the track record are received by the cloud computing component 102 from the capture device 110. In yet other examples, the image and the track record are received by the cloud computing component 102 from the edge device 112. In still further examples, the operation 502 is omitted, such as when a device implementing the method 500 has received or otherwise acquired the image and the track record, such as if the device implementing the method 500 also captured the image or has already performed at least some processing of the image.

At operation 504, the image is processed to determine a gender of a person depicted in the image. The processing is performed, in at least some examples, according to artificial intelligence algorithms. If the gender is determined from the image, the track record is updated at operation 506. The method 500 then proceeds to operation 508. In at least some examples, when the track record is updated with the determined gender, the track record is further updated with a confidence level. The confidence level indicates a determined or estimated confidence in an accuracy of the determined gender.

At operation 508, the image is processed to determine an ethnicity of a person depicted in the image. The processing is performed, in at least some examples, according to artificial intelligence algorithms. If the ethnicity is determined from the image, the track record is updated at operation 510. The method 500 proceeds to operation 512. In at least some examples, when the track record is updated with the determined ethnicity, the track record is further updated with a confidence level. The confidence level indicates a determined or estimated confidence in an accuracy of the determined ethnicity.

At operation 512, the image is processed to determine an age of a person depicted in the image. The processing is performed, in at least some examples, according to artificial intelligence algorithms. In at least some example, the age is represented as a numerical value or a range of numerical values. In other examples, the age is represented as a generalized category or classification such as child, youth, adult, senior, etc. If the age is determined from the image, the track record is updated at operation 514. The method 500 then proceeds to operation 516. In at least some examples, when the track record is updated with the determined age, the track record is further updated with a confidence level. The confidence level indicates a determined or estimated confidence in an accuracy of the determined age.

At operation 516, multiple track records are compared to determine at operation 518 whether the track records depict a same person. When the track records depict the same person, the method 500 proceeds to operation 520. When the track records do not depict the same person, the method 500 proceeds to operation 522. At operation 520, a dwell time is incremented. The dwell time, in at least some examples, is an incremental counter that tracks an amount of time that a person is detected as viewing the capture device 110.

At operation 522, a track file is updated and transmitted. In at least some examples, the track file collates data from multiple track records, as discussed elsewhere herein. For example, the track file may represent a store level view of data for multiple capture devices 110 and/or a capture device 110 over time. The transmission of the track file is, in some examples, to the cloud computing component 102 and/or a data store accessible by the cloud computing component 102.

Figure 6:
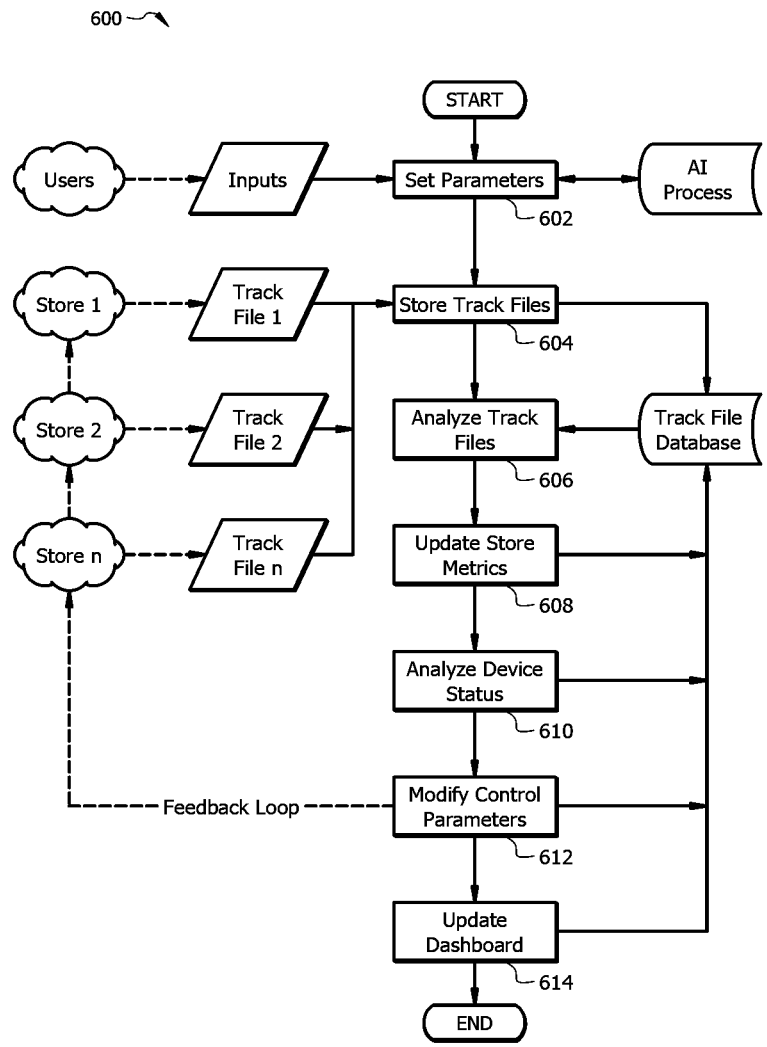
FIG. 6 is a flowchart of an illustrative method of data management and control in accordance with aspects of the present disclosure.

Referring now to FIG. 6 a flowchart of an illustrative method 600 in accordance with various examples is shown. The method 600 is, in at least some examples, a method of data management and control. The method 600 is, in some examples, performed by the cloud computing component 102.

At operation 602, reporting parameters are specified. The reporting parameters are specified, in some examples, based on or according to input received from users. In other examples, the reporting parameters are specified according to artificial intelligence processes or algorithms. In yet other examples, the reporting parameters are specified by a combination of input received from users and artificial intelligence processes or algorithms. The reporting parameters, in some examples, specify which parameters the cloud computing component 102 will output for review by users, such as via a dashboard or other graphical user interface. In yet other examples, the reporting parameters specify which parameters the cloud computing component 102 will determine, or attempt to determine, based on analyzing and/or processing received track files.

At operation 604, the cloud computing component 102 receives and stores one or more track files. The track files are received, in some examples, as inputs from one or more reporting locations, such as observed environments (e.g., stores). The track files are stored by the cloud computing component 102 in a track file database. In at least some examples, the track files are stored together as a track record that collates the data of the track files, as described above herein.

At operation 606, the cloud computing component 102 analyzes the track files received at operation 604 and/or track files received as input from the track file database. Multiple forms of analysis are capable at operation 606, including at least analysis or processing according to one or more artificial intelligence algorithms. For example, the cloud computing component 102 may analyze the track files to identify trends in the track files or insights derived from the track files. The cloud computing component 102 may analyze the track files to determine trends or insights for a particular observed environment, for a particular vendor, for a particular product or display, for observed environments in a particular region, for all observed environments, etc.

At operation 608, the cloud computing component 102 updates one or more metrics for one or more observed environments based on the analysis. For example, the cloud computing component 102 may update metrics related to averages, trends, minimums, maximums, or any other suitable or user-requested metrics derived from the track files for one or more observed environments. In at least some examples, the updated metrics are stored to a track file and/or track record in the track file database.

At operation 610, the cloud computing component 102 analyzes the status of one or more capture devices 110. For example, the cloud computing component 102 may analyze status or other control information regarding the capture device 110 that is included in one or more of the track files stored in the track file database. In at least one example, the analysis is a power management analysis that analyzes power related statuses and/or image capture frequency of the capture device(s) 110. In some examples, at least some information regarding the analysis is stored to a track file and/or track record in the track file database.

At operation 612, the cloud computing component 102 modifies control parameters for one or more capture devices 110. For example, the cloud computing component 102 may modify a frequency of image capture by the capture device(s) 110 or a mode of image capture (e.g., between motion or sync modes) by the capture device(s) 110. The cloud computing component 102 may further, or alternatively, modify processing options that are performed by the capture device(s) 110 and/or by the edge device(s) 112, information provided by the by the capture device(s) 110 and/or by the edge device(s) 112, etc. In at least some examples, the modified control parameters are sent to one or more of the observed environments from which track files were received at operation 604. In some examples, at least some information regarding the modified control parameters is stored to a track file and/or track record in the track file database. In at least some examples, the modification to the control parameters performed at operation 612 is based on results of the analysis of the status of the capture device(s) performed at operation 610. The modification of the control parameters may be for any suitable purpose, such as to increase a frequency of image capture to obtain more information, reduce a frequency of image capture to reduce power consumption of the capture device(s) 110.

Alternatively, in at least some examples the method 600 omits operation 612 such that the method 600 proceeds from operation 610 to operation 614 when the cloud computing component 102 determines based on the analysis of operation 610 that no changes are to be made to control parameters of the capture devices 110.

At operation 614, the cloud computing component 102 updates an information dashboard. The information dashboard is, in some examples, a graphical user interface that reports information to the users from which input was received at operation 602. For example, in some implementations the information dashboard reports at least some parameters set at operation 602. The information is, in some examples, store metrics and/or device status information, such as discussed above with respect to operation 608 and/or operation 610. In some examples, at least some information regarding the updated information dashboard is stored to a track file and/or track record in the track file database.

As used herein, the images captured by the capture device can be processed to obtain various information from the images such as demographic information, spacing information, temperature data, etc. Various types of machine learning algorithms such as facial recognition algorithms, demographic algorithms and the like can be used to obtain the information from the images.

Once the images are captured, they can be processed as described herein. In some embodiments, the images can be processed using an information determination algorithm(s) as part of an image processing system that can process an image to determine various information such as demographic information. Different imaging processing algorithms may be used to process an image and, thus, are suitable to generate different types of information or emphasize on different efficiency factors (e.g., speed vs. accuracy). In some embodiments, the information determination algorithm(s) can be configured to retrieve an image frame and send the digital image frame data to an image processing engine, to receive the demographic-map data from the image processing engine, and send the demographic-map data to an information server that can store the obtained information. The information determination algorithm(s) can comprise one or more algorithms can be used for one or more types of information. For example, a separate determination algorithm may be used for each type of demographic information, and in some embodiments, multiple determination algorithms can be used for the same demographic information, where a confidence interval for each algorithm can be used to determine a final classification of the information from the image.

An interface available to a user of the system can be configured to allow a user to selectively determine which demographic features are determined from the images obtained by the capture device, stored, and presented to the user. For example, the information determination algorithm(s) can be configured to collect personal attributes such as gender, age, ethnicity, height, skin color, hair color, hair length, facial hair, weight, static/in motion, accessories, stroller, glasses, beard, dwell time, temperature, and the like for each person in the images. Further, the image processing system can also be configured to collect data relating to a person's behavior such as the dwell time at the scene (e.g., how long a person has stayed at the scene) or attentiveness (e.g., whether a person is paying attention to the products and/or display). In some embodiments, those configurations can be set up in a configuration file, which will be read by the image processing system.

The information determination algorithm(s) can comprise one or more algorithms or techniques to process the features of the images in order to detect persons in the image frame as well as the personal attributes of each person. For example, based on the needs, the image processing engine can use one or more of a naïve/normal classifier, binary decision trees, boosting techniques, random trees, a Haar classifier, and a Viola-Jones classifier, neural networks, Bayesian classifiers, multivariate processors. The image processing engine can also use other techniques such as a k-means cluster. The image processing engine can adjust the weight/importance factors of some or all of the features and according to which the features are evaluated by the image processing engine to detect different attributes.

Figure 7:
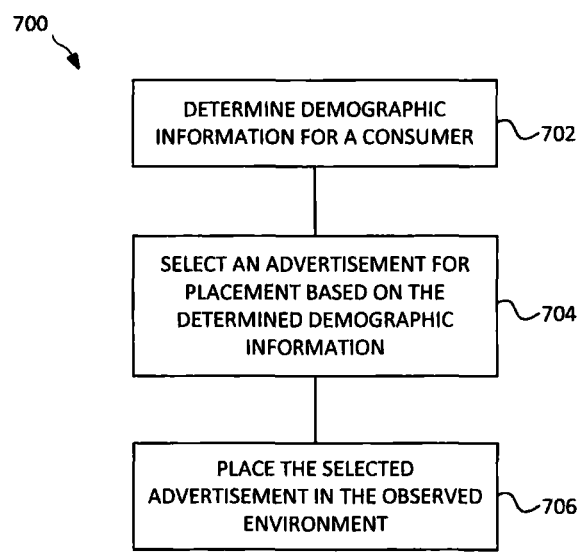
FIG. 7 is a flowchart of an illustrative method of advertisement placement in accordance with aspects of the present disclosure.

Referring now to FIG. 7 a flowchart of an illustrative method 600 in accordance with various examples is shown. The method 700 is, in at least some examples, a method advertisement placement. The method 700 is, in some examples, performed at least partially by the cloud computing component 102 of the system 100 of FIG. 1.

At operation 702, demographic information is determined for a consumer. In some examples, the demographic information is determined by the cloud computing component 102. In other examples, the demographic information is at least partially determined by the capture device 110 and/or the edge device 112 and provided to the cloud computing component 102. The demographic information may be determined as described above herein, such as based on images or other data of or relating to consumers who are present nearby the display 108 and capture device 110.

At operation 704, an advertisement is selected for placement based on the determined demographic information. In some aspects, the advertisement can be an environmental advertisement as described herein. For example, the cloud computing component 102 may select an advertisement from a group of available advertisements that has one or more criteria (e.g., targeting criteria) that are equivalent to the determined demographic information. In some examples, the advertisements and the targeting criteria may be provided by a third-party user, such as via a dashboard or graphical interface that interfaces with the cloud computing component 102, as described above.

At operation 706, the selected advertisement is placed in the observed environment 104. For example, the cloud computing device 102 places the advertisement by transmitting the advertisement to the edge device 112, which in turn transmits the advertisement to the capture device 110, which transmits the advertisement to the user device 114, as described above herein. In some examples, the advertisement, or other information related to the advertisement, is instead, or additionally, displayed on an electronic display device of the display 108 and/or capture device 110. In some examples, the cloud computing device 102 places the advertisement by transmitting the advertisement to the edge device 112, which in turn transmits the advertisement to the user device 114, as described above herein. In some examples, the cloud computing device 102 places the advertisement by transmitting the advertisement to the user device 114, as described above herein. The advertisement may be placed to the user device 114 in a just-in-time manner, as described above herein. In some examples, transmitting the advertisement includes transmitting data representing the content of the advertisement (e.g., text, images, etc.) In other examples, transmitting the advertisement includes transmitting a token or other identifier, based on which the user device 114 obtains the advertisement from any suitable source via any suitable communications. In other examples, transmitting the advertisement includes transmitting a token or other identifier that causes the user device 114 to present the advertisement according to augmented reality technology (e.g., to initiate or otherwise launch an augmented-realty session or experience). In some aspects, transmitting the advertisement can include presenting or performing an environmental advertisement in the environment in which the capture device is located.

In some examples, the computing device 102 receives information about user interaction with the advertisement. For example, responsive to the advertisement being placed in the observed environment 104, the computing device 102 may cause the capture device 110 to capture additional data about the consumer. The additional data may include a dwell time of the consumer after placement of the advertisement, a time spent by the consumer viewing the advertisement, interaction by the consumer with the advertisement, etc. The additional data may be provided to the cloud computing component 102, which may refine future ad selections based on the additional data, may provide the additional data to the third-party user who provided the advertisement and/or targeting criteria, may process the additional data to determine various insights related to the advertisement, the consumer, the accuracy of the determined demographic information, the accuracy of the advertisement selection, the effectiveness of the advertisement placement, a value of the advertisement placement, etc.

Figure 8:
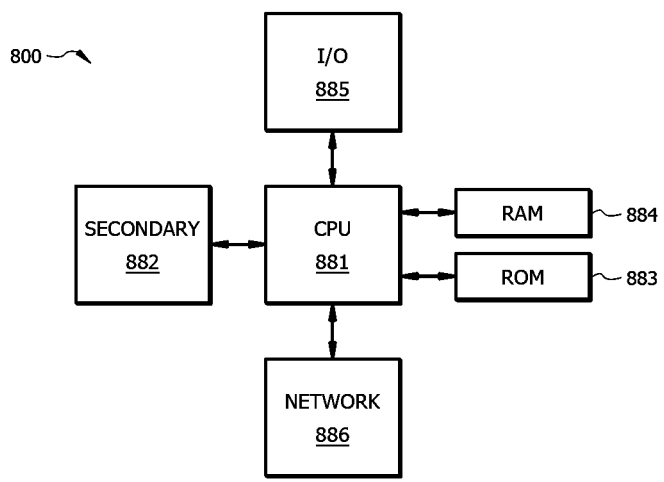
FIG. 8 is a schematic of an exemplary computer system capable of use with the present embodiments.

Any of the systems and methods disclosed herein such as the capture device 110, the edge device 112, and the computing on the cloud computing component 102 can be carried out on a computer or other device comprising a processor. FIG. 8 illustrates a computer system 800 suitable for implementing one or more embodiments disclosed herein. The computer system 800 includes a processor 881 (which may be referred to as a central processor unit or CPU, a computing or processing node, etc.) that is in communication with memory devices including secondary storage 882, read only memory (ROM) 883, random access memory (RAM) 886, input/output (I/O) devices 885, and network connectivity devices 886. The processor 881 may be implemented as one or more CPU chips.

It is understood that by programming and/or loading executable instructions onto the computer system 800, at least one of the processor 881, the RAM 884, and the ROM 883 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 800 is turned on or booted, the processor 881 may execute a computer program or application. For example, the processor 881 may execute software or firmware stored in the ROM 883 or stored in the RAM 884. In some cases, on boot and/or when the application is initiated, the processor 881 may copy the application or portions of the application from the secondary storage 882 to the RAM 884 or to memory space within the processor 881 itself, and the processor 881 may then execute instructions that the application is comprised of. In some cases, the processor 881 may copy the application or portions of the application from memory accessed via the network connectivity devices 886 or via the I/O devices 885 to the RAM 884 or to memory space within the processor 881, and the processor 881 may then execute instructions that the application is comprised of. During execution, an application may load instructions into the processor 881, for example load some of the instructions of the application into a cache of the processor 881. In some contexts, an application that is executed may be said to configure the processor 881 to do something, e.g., to configure the processor 881 to perform the function or functions promoted by the subject application. When the processor 881 is configured in this way by the application, the CPU 882 becomes a specific purpose computer or a specific purpose machine.

The secondary storage 882 is typically comprised of one or more disk drives or tape drives and is used for non-volatile storage of data and as an over-flow data storage device if RAM 884 is not large enough to hold all working data. Secondary storage 882 may be used to store programs which are loaded into RAM 884 when such programs are selected for execution. The ROM 883 is used to store instructions and perhaps data which are read during program execution. ROM 883 is a non-volatile memory device which typically has a small memory capacity relative to the larger memory capacity of secondary storage 882. The RAM 884 is used to store volatile data and perhaps to store instructions. Access to both ROM 883 and RAM 884 is typically faster than to secondary storage 882. The secondary storage 882, the RAM 884, and/or the ROM 883 may be referred to in some contexts as computer readable storage media and/or non-transitory computer readable media.

I/O devices 885 may include printers, video monitors, liquid crystal displays (LCDs), LED displays, touch screen displays, keyboards, keypads, switches, dials, mice, track balls, voice recognizers, card readers, paper tape readers, or other well-known input devices.

The network connectivity devices 886 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), LTE, worldwide interoperability for microwave access (WiMAX), near field communications (NFC), radio frequency identity (RFID), and/or other air interface protocol radio transceiver cards, and other well-known network devices. These network connectivity devices 886 may enable the processor 881 to communicate with the Internet or one or more intranets. With such a network connection, it is contemplated that the processor 881 might receive information from the network, or might output information to the network (e.g., to an event database) in the course of performing the above-described method steps. Such information, which is often represented as a sequence of instructions to be executed using processor 881, may be received from and outputted to the network, for example, in the form of a computer data signal embodied in a carrier wave.

Such information, which may include data or instructions to be executed using processor 881 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 881 executes instructions, codes, computer programs, scripts which it accesses from hard disk, floppy disk, optical disk (these various disk-based systems may all be considered secondary storage 882), flash drive, ROM 883, RAM 884, or the network connectivity devices 886. While only one processor 881 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 882, for example, hard drives, floppy disks, optical disks, and/or other device, the ROM 883, and/or the RAM 884 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and/or other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 882, to the ROM 883, to the RAM 884, and/or to other non-volatile memory and volatile memory of the computer system 800. The processor 881 may process the executable instructions and/or data structures in part by directly accessing the computer program product, for example by reading from a CD-ROM disk inserted into a disk drive peripheral of the computer system 800. Alternatively, the processor 881 may process the executable instructions and/or data structures by remotely accessing the computer program product, for example by downloading the executable instructions and/or data structures from a remote server through the network connectivity devices 886. The computer program product may comprise instructions that promote the loading and/or copying of data, data structures, files, and/or executable instructions to the secondary storage 882, to the ROM 883, to the RAM 884, and/or to other non-volatile memory and volatile memory of the computer system 800.

In some contexts, the secondary storage 882, the ROM 883, and the RAM 884 may be referred to as a non-transitory computer readable medium or a computer readable storage media. A dynamic RAM embodiment of the RAM 884, likewise, may be referred to as a non-transitory computer readable medium in that while the dynamic RAM receives electrical power and is operated in accordance with its design, for example during a period of time during which the computer system 800 is turned on and operational, the dynamic RAM stores information that is written to it. Similarly, the processor 881 may comprise an internal RAM, an internal ROM, a cache memory, and/or other internal non-transitory storage blocks, sections, or components that may be referred to in some contexts as non-transitory computer readable media or computer readable storage media.

While various systems, devices, and methods are described herein, some aspects can include, but are not limited to:

In a first aspect, a device comprises: a dye-sensitized solar panel configured to harvest power from energy emitted as light by an indoor light source; a camera; and a processor coupled to the dye-sensitized solar panel and the camera and configured to: receive at least some of the power harvested by the dye-sensitized solar panel; capture an image via the camera; and transmit the image to a computing device.

A second aspect can include the device of the first aspect, further comprising a battery coupled to the dye-sensitized solar panel and the processor, wherein the battery is configured to store at least some of the power harvested by the dye-sensitized solar panel and provide at least some of the stored power to the processor.

A third aspect can include the device of the first aspect, wherein the processor captures the image according to one or more control parameters received from the computing device.

A fourth aspect can include the device of the third aspect, wherein the one or more control parameters specify a frequency at which the processor is configured to capture images.

A fifth aspect can include the device of the first aspect, wherein the processor is further configured to process the captured image prior to transmitting the captured image to the computing device.

A sixth aspect can include the device of the fifth aspect, wherein the processor is further configured to process the image by executing at least one artificial intelligence process to: analyze the captured image to determine whether a face is detected in the image; and when the face is detected in the image, determine whether the face is viewing the device within a margin of tolerance.

A seventh aspect can include the device of the sixth aspect, wherein the processor is further configured to: generate a track record; write status information regarding the device to the track record; write an indication to the track record of whether a face was detected in the image; and when a face is detected in the image, write an indication to the track record of whether the face is viewing the device within the margin of tolerance.

An eighth aspect can include the device of the first aspect, wherein the indoor light source is fluorescent lights or incandescent lights.

A ninth aspect can include the device of the first aspect, wherein the indoor light source is light emitting diodes.

In a tenth aspect, a system comprises: a computing device; an artificial light source; and an image capture device wirelessly communicatively coupled to the computing device, wherein the image capture device is configured to: harvest power from light emitted by the artificial light source; capture an image via the camera; and transmit the image to the computing device.

An eleventh aspect can include the system of the tenth aspect, wherein the image capture device comprises: a dye-sensitized solar panel configured to harvest power from energy of the light emitted by the artificial light source; a camera; a processor coupled to the dye-sensitized solar panel and the camera; and a battery coupled to the dye-sensitized solar panel and the processor, wherein the battery is configured to store at least some of the power harvested by the dye-sensitized solar panel and provide at least some of the stored power to the processor.

A twelfth aspect can include the system of the tenth aspect, wherein the image capture device is further configured to: process the image by executing at least one artificial intelligence process to: analyze the captured image to determine whether a face is detected in the image; and when the face is detected in the image, determine whether the face is viewing the device within a margin of tolerance; generate a track record; write status information regarding the device to the track record; write an indication to the track record of whether a face was detected in the image; and when a face is detected in the image, write an indication to the track record of whether the face is viewing the device within the margin of tolerance.

A thirteenth aspect can include the system of the twelfth aspect, wherein the computing device is an edge device communicatively coupled between the image capture device and a cloud computing component and wherein the edge device is configured to: receive a plurality of track records and a plurality of captured images; process an image from among the plurality of captured images by executing at least one artificial intelligence process to analyze the captured image to determine metrics related to a person depicted in the image; update a track record from among the plurality of track records corresponding to the processed image with a result of the analysis; collate the plurality of track records into a track file; and transit the track file to the cloud computing component.

A fourteenth aspect can include the system of the thirteenth aspect, wherein the edge device is further configured to transmit one or more commands to the image capture device based on a result of the processing of the image, and wherein the one or more commands modify a frequency with which the image capture device captures images to reduce power consumption of the image capture device.

A fifteenth aspect can include the system of the thirteenth aspect, wherein the cloud computing component is configured to: receive a plurality of track files; analyze at least some of the plurality of track files by executing at least one artificial intelligence process to: identify trends indicated in the at least some of the plurality of track files; analyze a status of the image capture device; determine one or more modification to control parameters of the image capture device based on the analysis of the at least some of the plurality of track records; and generate a user interface comprising at least some information obtained by the analysis of the at least some of the plurality of track records, including at least the identified trends.

A sixteenth aspect can include the system of the fifteenth aspect, wherein the cloud computing component is further configured to transmit one or more commands to the edge device, based on a result of the analysis of the at least some of the plurality of track files, for further transmission to the image capture device, and wherein the one or more commands modify a frequency with which the image capture device captures images to reduce power consumption of the image capture device.

A seventeenth aspect can include the system of the thirteenth aspect, wherein the edge device comprises cellular communication functionality, and wherein the edge device communicates with the cloud computing component via the cellular communication functionality.

An eighteenth aspect can include the system of the tenth aspect, wherein the artificial light source in fluorescent lights or incandescent lights.

A nineteenth aspect can include the system of the tenth aspect, wherein the artificial light source is a light emitting diode.

A twentieth aspect can include the system of the nineteenth aspect, wherein a wavelength of light emitted by the light emitting diode is tuned to a wavelength at which energy output of the light emitting diode is maximized.

In a twenty first aspect, a device comprises: a solar panel configured to harvest power from energy emitted as light by a light source; a sensor; and a processor coupled to the solar panel and the sensor and configured to: receive at least some of the power harvested by the solar panel; capture data via the sensor; transmit the data to a computing device; receive an advertisement from the computing device, the advertisement selected from a group of advertisements based on demographic information determined according to the data; and provide the advertisement to a user located proximate to the device, the data and the demographic information corresponding to the user.

A twenty second aspect can include the device of the twenty first aspect, further comprising a battery coupled to the solar panel and the processor, wherein the battery is configured to store at least some of the power harvested by the solar panel and provide at least some of the stored power to the processor.

A twenty third aspect can include the device of the twenty first aspect, wherein the processor captures the data according to one or more control parameters received from the computing device.

A twenty fourth aspect can include the device of the twenty third aspect, wherein the one or more control parameters specify a frequency at which the processor is configured to capture data.

A twenty fifth aspect can include the device of the twenty first aspect, wherein the processor is further configured to process the captured data prior to transmitting the captured data to the computing device.

In a twenty sixth aspect, a method comprises: receiving, via a computing device, data of a consumer, the data captured by a capture device; determining, via the computing device, demographic information of the consumer based on the captured data; selecting an advertisement from among a group of advertisements based on the determined demographic information; and providing the advertisement to the consumer.

A twenty seventh aspect can include the method of the twenty sixth aspect, wherein the computing devices provide the advertisement to the capture device to cause the capture device to provide the advertisement to a user device of the consumer.

A twenty eighth aspect can include the method of the twenty sixth aspect, wherein the computing device provides the advertisement to a user device of the consumer via a bridge device through which the computing device communicates with the capture device.

A twenty ninth aspect can include the method of the twenty sixth aspect, wherein the computing device provides the advertisement in the form of a data element that causes a user device of the consumer to obtain and display content of the advertisement.

A thirtieth aspect can include the method of the twenty sixth aspect, wherein the computing device providing the advertisement to the consumer causes a user device of the consumer to initiate an augmented reality experience based on the advertisement.

A thirty first aspect can include the method of the twenty sixth aspect, further comprising, responsive to providing the advertisement to the consumer, receiving information regarding interaction by the consumer with the advertisement.

A thirty second aspect can include the method of the twenty sixth aspect, wherein the advertisement is an environmental advertisement.

A thirty third aspect can include the method of the thirty second aspect, wherein the environmental advertisement comprises at least one of an audio selection, a lighting selection, or an environmental parameter.

A thirty fourth aspect can include the method of the thirty second or thirty third aspect, wherein the computing device provides the environmental advertisement to an environment in which the capture device is located.

In a thirty fifth aspect, a system comprises: a computing device; and a capture device wirelessly communicatively coupled to the computing device, wherein the capture device is configured to: harvest power from light emitted by a light source; capture data via a sensor of the capture device;

transmit the data to the computing device; receive a data element associated with an advertisement from the computing device, the advertisement determined at least partially according to the data; and cause the advertisement to be presented to a consumer corresponding to the data.

A thirty sixth aspect can include the system of the thirty fifth aspect, wherein the capture device comprises: a solar panel configured to harvest power from energy of the light emitted by the light source; a camera; the sensor; a processor coupled to the solar panel, the sensor, and the camera; and a battery coupled to the solar panel and the processor, wherein the battery is configured to store at least some of the power harvested by the solar panel and provide at least some of the stored power to the processor.

A thirty seventh aspect can include the system of the thirty fifth aspect, wherein the computing device is further configured to transmit one or more commands to the capture device based on a result of processing of the data, and wherein the one or more commands modify a frequency with which the capture device captures data to reduce power consumption of the capture device.

A thirty eighth aspect can include the system of the thirty fifth aspect, wherein, responsive to receipt of the data element, the capture device causes a user device of the consumer to display the advertisement in an augmented-reality environment.

A thirty ninth aspect can include the system of the thirty fifth aspect, wherein, responsive to receipt of the data element, the capture device provides the advertisement to a user device of the consumer.

A fortieth aspect can include the system of the thirty fifth aspect, wherein, responsive to receipt of the data element, the capture device provides a second data element to a user device of the consumer to cause the user device to obtain the advertisement from a remote source.

A forty first aspect can include the system of the thirty fifth aspect, wherein the capture device is further configured as a beacon device that causes a user device of the consumer, responsive to receipt of a transmission from the capture device, to initiate an augmented-reality session.

A forty second aspect can include the system of the thirty fifth aspect, wherein the light source is an artificial light source.

A forty third aspect can include the system of the thirty fifth aspect, wherein the light source is a naturally occurring light source.

While the operations of the various methods described herein have been discussed and labeled with numerical reference, in various examples the methods include additional operations that are not recited herein. In some examples any one or more of the operations recited herein include one or more sub-operations. In some examples any one or more of the operations recited herein is omitted. In some examples any one or more of the operations recited herein is performed in an order other than that presented herein (e.g., in a reverse order, substantially simultaneously, overlapping, etc.). Each of these alternatives is intended to fall within the scope of the present disclosure.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
  a solar panel configured to harvest power from energy emitted as light by an indoor light source;
  a camera; and
  a processor coupled to the solar panel and the camera and configured to:
    receive at least some of the power harvested by the solar panel;
    capture an image via the camera;
    process the image to determine demographic information from the image by executing at least one artificial intelligence process to:
      analyze the captured image to determine whether a face is detected in the image; and
      when the face is detected in the image, determine whether the face is viewing the device within a margin of tolerance; and
    generate a track record comprising the demographic information obtained from the image;
    write status information regarding the device to the track record;
    write an indication to the track record of whether the face was detected in the image; and
    when the face is detected in the image, write an indication to the track record of whether the face is viewing the device within the margin of tolerance; and
    transmit the image with the track record to a computing device.

2. The device of claim 1, further comprising a battery coupled to the solar panel and the processor, wherein the battery is configured to store at least some of the power harvested by the solar panel and provide at least some of the stored power to the processor.

3. The device of claim 1, wherein the processor captures the image according to one or more control parameters received from the computing device.

4. The device of claim 3, wherein the one or more control parameters specify a frequency at which the processor is configured to capture images.

5. The device of claim 1, wherein the indoor light source is fluorescent lights or incandescent lights.

6. The device of claim 1, wherein the indoor light source is light emitting diodes.

7. A system, comprising:
  a computing device;
  an artificial light source; and
  an image capture device wirelessly communicatively coupled to the computing device, wherein the image capture device is configured to:
    harvest power from light emitted by the artificial light source;

capture an image via a camera;
process the image to determine demographic information from the image by executing at least one artificial intelligence process to:
analyze the captured image to determine whether a face is detected in the image; and
when the face is detected in the image, determine whether the face is viewing the device within a margin of tolerance; and
generate a track record comprising the demographic information obtained from the image;
write status information regarding the image capture device to the track record;
write an indication to the track record of whether the face was detected in the image; and
when the face is detected in the image, write an indication to the track record of whether the face is viewing the device within the margin of tolerance; and
transmit the track record to the computing device.

8. The system of claim 7, wherein the image capture device comprises:
a solar panel configured to harvest power from energy of the light emitted by the artificial light source;
a camera;
a processor coupled to the solar panel and the camera; and
a battery coupled to the solar panel and the processor, wherein the battery is configured to store at least some of the power harvested by the solar panel and provide at least some of the stored power to the processor.

9. The system of claim 7, wherein the artificial light source is fluorescent lights or incandescent lights.

10. The system of claim 7, wherein the artificial light source is a light emitting diode.

11. The system of claim 10, wherein a wavelength of light emitted by the light emitting diode is tuned to a wavelength at which energy output of the light emitting diode is maximized.

12. The system of claim 7, further comprising an edge device communicatively coupled to the image capture device and a cloud computing component, wherein the edge device is further configured to transmit one or more commands to the image capture device based on a result of the processing of the image, and wherein the one or more commands modify a frequency with which the image capture device captures images to reduce power consumption of the image capture device.

13. The system of claim 12, wherein the cloud computing component is configured to:
receive a plurality of track files;
analyze at least some of the plurality of track files by executing at least one artificial intelligence process to:
identify trends indicated in the at least some of the plurality of track files;
analyze a status of the image capture device;
determine one or more modifications to control parameters of the image capture device based on the analysis of the at least some of the plurality of track records; and
generate a user interface comprising at least some information obtained by the analysis of the at least some of the plurality of track records, including at least the identified trends.

14. The system of claim 13, wherein the cloud computing component is further configured to transmit one or more commands to the edge device, based on a result of the analysis of the at least some of the plurality of track files, for further transmission to the image capture device, and wherein the one or more commands modify the frequency with which the image capture device captures images to reduce power consumption of the image capture device.

15. The system of claim 12, wherein the edge device comprises cellular communication functionality, and wherein the edge device communicates with the cloud computing component via the cellular communication functionality.

16. A system, comprising:
an image capture device, the image capture device comprising:
a solar panel configured to harvest power from energy emitted as light by a light source;
a camera; and
a processor coupled to the solar panel and the camera and configured to:
receive at least some of the power harvested by the solar panel;
capture an image via the camera; and
process the image;
analyze the captured image to determine whether a face is detected in the image;
when the face is detected in the image, determine whether the face is viewing the device within a margin of tolerance;
generate a track record;
write an indication to the track record of whether the face was detected in the image; and
when the face is detected in the image, write an indication to the track record of whether the face is viewing the device within the margin of tolerance; and
transmit the image and the track record to a computing device.

17. The system of claim 16, further comprising an edge device communicatively coupled to the image capture device and a cloud computing component, wherein the edge device is further configured to transmit one or more commands to the image capture device based on a result of the processing of the image, and wherein the one or more commands modify a frequency with which the image capture device captures images to reduce power consumption of the image capture device.

* * * * *